United States Patent [19]
Tran

[11] Patent Number: 5,987,620
[45] Date of Patent: Nov. 16, 1999

[54] METHOD AND APPARATUS FOR A SELF-TIMED AND SELF-ENABLED DISTRIBUTED CLOCK

[75] Inventor: Thang Tran, 5209 Eagle Trace Trail, Austin, Tex. 78730

[73] Assignee: Thang Tran, Austin, Tex.

[21] Appl. No.: 08/969,866

[22] Filed: Nov. 14, 1997

Related U.S. Application Data

[60] Provisional application No. 60/059,407, Sep. 19, 1997.

[51] Int. Cl.⁶ ....................................................... G06F 1/04
[52] U.S. Cl. ........................................... 713/600; 713/501
[58] Field of Search ..................................... 395/559, 555, 395/551, 568, 575; 713/500, 501, 503, 400, 401

[56] References Cited

U.S. PATENT DOCUMENTS

| | | | |
|---|---|---|---|
| 5,454,090 | 9/1995 | Fleck et al. ............................... | 395/375 |
| 5,475,320 | 12/1995 | Ko .............................................. | 326/21 |
| 5,619,464 | 4/1997 | Tran ........................................... | 365/203 |
| 5,642,499 | 6/1997 | Ohba et al. ................................ | 395/569 |
| 5,710,910 | 1/1998 | Kehl et al. ................................. | 713/400 |
| 5,717,910 | 2/1998 | Henry ........................................ | 395/568 |
| 5,752,012 | 5/1998 | Smith ......................................... | 713/600 |
| 5,802,356 | 9/1998 | Gaskins et al. ........................... | 395/555 |

*Primary Examiner*—Joseph E. Palys
*Assistant Examiner*—Abu Hossain
*Attorney, Agent, or Firm*—Akin, Gump, Strauss, Hauer & Feld, L.L.P.

[57] ABSTRACT

A self-timed and self-enabled distributed clock is provided for pipeline processor design having functional blocks which include one or more pipeline stages for processing instructions and operations. Each pipeline stage of the processor includes self-timed logic and an enable signal to set up the valid data input to the next pipeline stage. The self-timed logic is used instead of a central, synchronous clock having a predetermined period and provides flexibility of expanding or contracting the clock period in multiple time units depending on the functionality of each pipeline stage. The interfacing between the pipeline stages is handled by a queue buffer which stores incoming instructions to keep the pipeline fully occupied any time there are instructions in the pipeline. A functional unit and its distributed clock are activated only if there is instruction in the pipeline and is otherwise idle. The self-timed clock provides a fixed time unit or plurality of time units to each pipeline stage which is deterministic for verification and testing purposes. The self-timed and self-enabled clock, along with the queue buffers associated therewith, provide flexibility for implementing each pipeline stage while reducing power, noise and clock skew and while improving the overall instruction-per-cycle performance of the processor.

58 Claims, 13 Drawing Sheets

METHOD AND APPARATUS FOR A SELF-TIMED AND SELF-ENABLED DISTRIBUTED CLOCK

CROSS-REFERENCE TO RELATED APPLICATION(S)

The present application is based on U.S. Provisional Application Serial No. 60/059,407, filed Sep. 19, 1997, entitled "Method and Apparatus for a Self-Timed and Self-Enabled Distributed Clock", which is hereby incorporated herein by reference in its entirety.

BACKGROUND OF THE INVENTION

1. Field of the Invention

This invention relates to a self-timed and self-enabled distributed clock. More particularly, this invention relates to a self-timed and self-enabled distributed clock for a pipeline-processing unit of a microprocessor.

2. Brief Description of the Related Technology

In general, microprocessors (processors) achieve high performance by executing multiple instructions per clock cycle and by choosing the shortest possible clock cycle. The term "clock cycle" refers to an interval of time accorded to various stages of processing pipeline within the microprocessor. Storage devices (e.g. registers and arrays) capture their values according to a rising or falling edge of a clock signal defining the clock cycle. The storage devices store the values until a subsequent rising or falling edge of the clock signal, respectively. The phrase "instruction processing pipeline" is used herein to refer to the logic circuits employed to process instructions in a pipeline fashion. Although the pipeline may include any number of stages, where each stage processes at least a portion of an instruction, instruction processing generally includes the steps of: decoding the instruction, fetching data operands, executing the instruction and storing the execution results in the destination identified by the instruction.

One problem inherit with a pipeline processing unit is stalling. If a subsequent pipeline stage generates a stall condition, then all previous pipeline stages must stall and retain all data until the stall condition is resolved and removed. The stall condition is derived from the unavailability of resources normally associated with a speed-path circuit. Furthermore, the stall signal, which indicates the stall condition, must traverse all previous pipeline stages to have the previous stages conditionally stall and refresh their data. The physical routing of the stall signal and associated "stall" logic increases the clock cycle time and decreases the clock frequency for the entire pipeline.

Because processor clock frequencies are expected to reach the gigahertz range by the end of the century, clock skew and jitter may account for up to 15% of the clock cycle period, leaving 85% of the period for computation logic. Clock skew is the difference in arrival times of clock edges at different parts of the circuit. Clock skew bounds the minimum and maximum delay through computation logic. Interconnection delays do not scale linearly with increasing clock frequencies, as clock skew takes an increasingly larger portion of useful clock cycles. The clock signal is also a major contributor to power consumption and noise, especially when there is no other activity. The clock can account for up to 25% of the total power consumption.

The harmonic noise over the spectrum of frequencies is related to the clock frequency of a synchronous clock. Electro-Magnetic Interference (EMI) is becoming increasingly important in the portable communications market place both from a technical perspective, with interference in analog, memory, and RF components, and from a regulations perspective, with increasingly rigorous EMI compliance specifications and testing. The logic gates in an integrated circuit, or chip, are forced to switch states simply because they are driven by a synchronous clock and not because they are performing any useful operation. In power-down mode at high clock frequency, special logic is used to gradually decrease or increase the clock frequency to the lowest level or the highest level, respectively. This is done because instantaneously turning on and off the high frequency clock causes a power surge which would cause failure in CMOS devices. Time is wasted in ramping the frequency down and up. These problems are mostly solved with asynchronous processing design.

Asynchronous processing design, however, inherently has another associated set of problems, mostly related to verification, testing, and marketing. An advantage of a synchronous clock design is that all components start together and generate output in a predetermined and predictable fashion. It is much easier to verify a synchronous design. For an asynchronous design, if each component is working at its own pace, the verification process is very difficult. The outputs of the processor are not deterministic due to actual silicon process variations. Additionally, since the gate delay varies based on the process technology, it is difficult to verify and test an output. A glitch in an asynchronous design can cause the output to be incorrect in comparison to a synchronous design where the state of a signal matters only at a next clock edge.

One prior art approach to asynchronous processing design is design techniques used on Advanced RISC Machines (ARM) processors at the University of Manchester, United Kingdom. The asynchronous ARM design technique uses request-and-acknowledge handshake protocol for synchronization between processing blocks. This technique requires several logic gate delays between the blocks for this handshake protocol. This ARM technique arguably does not show an improvement in performance over synchronous designs, but shows an advantage over synchronous designs in reducing power dissipation.

Traditionally, a two-phase synchronous clock design has been used in processor design. In two-phase clock design, one phase is normally used for precharging while the other is used for processing, which is a very convenient method for designing with a dynamic circuit. However, in two-phase clock design, the penalty due to the clocks is worse at high clock frequencies because the clock skew and jitter occur during two phases in a cycle and the two phases must be non-overlapping.

A single edged clock design is better suited for a higher performance and higher speed processor. If the second edge is needed within a functional block, it is generated locally. It is more efficient for the functional block to generate its own phase for the required logical function. Multiple clock edges can be created for blocks with many cascaded dynamic (precharge-discharge) circuits. However, the design of multiple clock edges within a clock cycle can become complex and require redesigning the clock edges whenever the logic is modified.

Therefore, the need exists for an asynchronous clock design having the heretofore typically mutually exclusive advantages of low power dissipation, and an easily verifiable output where all components start together and generate output in a predetermined and predictable fashion.

SUMMARY OF THE INVENTION

The problems outlined above for prior art designs are in large part resolved by a distributed self-timed and self-enabled clock design in accordance with the present invention. The present invention is adaptable for use in any digital circuit clock design. In particular, the present invention provides self-timed and self-enabled clocks distributed across all pipeline-processing units which allows the pipeline architecture to execute instructions at the highest possible processing frequency. In general, the self-timed and self-enabled clock according to the present invention is distributed to various parts of the design and pipeline stages, rather than a centralized clock. The self-timed and self-enabled clock is referred to herein as a self-clock.

The self-clock is distributed to each pipeline stage in the pipeline-processing unit. The self-clock and processing unit of the current pipeline stage are enabled by the output clock of the self-clock from the previous pipeline stage. The self-clock of the current pipeline stage in turn enables the self-clock and processing unit of the next subsequent pipeline stage. All self-clocks have the same period. Each pipeline stage uses an edge of the input clock, which has been output from the previous pipeline stage, thus avoiding a clock skew problem. Since the self-clocks and processing units are enabled only with valid data, the pipeline-processing unit according to this invention avoids clock jitter, and reduces power dissipation, noise, and electromagnetic interference associated with a centralized clock.

As with the clock period for a synchronous design, the self-timed clocks are designed to have the worst-case speed path through all pipeline stages. In one embodiment, the clock according to the present invention retains all pipeline stages similar to a synchronous design, thus the verification task will be similar to that of a synchronous design. However, the self-timed and self-enabled clock is designed to generate a negative pulse at the end of a cycle. The clock pulse and valid input data from one pipeline stage will start the self-timed clock and the operation of the next subsequent pipeline stage. Logic can only change state with the presence of a valid input clock pulse. The high-to-low transition of the clock pulse is used to latch data. The low-to-high transition is used to start the delay chain for the self-timed clock. The low-to-high transitions of the previous, current and next subsequent stages' clocks are used to start the delay chain for the self-time circuit of the current stage's clock. Therefore, the current stage's clock is synchronized with the previous and next subsequent stages' clocks.

The first and the last stages of the pipeline-processing unit are synchronized with one or more external clocks. All internal distributed clocks are designed to match the frequency of an external clock. A small mismatch in the self-time circuit does not matter since all pipeline stages are synchronized together. All distributed self-timed clocks are designed to have a matching delay. Each individual self-time delay should also account for a certain amount of the interconnection delay and a validation condition, possibly a worst case delay. Since the high-to-low transition of the clock edge is used for latching data and the low-to-high transition is used for synchronization of the clocks, the high-to-low transition has much more loading than the low-to-high transition. In CMOS, the N transistor, which is used for the high-to-low transition, is much stronger than the P transistor, which is used for low-to-high transition. Thus, it is more efficient, using less area, for the present clock design to generate a negative clock pulse in CMOS technology.

The self-clock can be distributed per pipeline stage or be an integral part of the pipeline stage. For example, the execution unit of the processor has many functions, e.g. shifter, arithmetic-logical unit, and comparator. A single self-clock can be used for the execution unit, or a plurality of self-clocks used for each function of the execution unit. Since the clocks are self-timed and distributed, it is possible to have different clock frequencies within the same processor.

In another embodiment, the distributed clock period is designed to be multiple of a time unit. The time unit is the minimum required time for processing a specific function of a pipeline stage. The self-timed delay is implemented as a multiple of the time units. The fixed time unit is helpful for synchronization with an external clock. The processing unit is efficient as long as the required input bandwidth for each pipeline stage is satisfied. For example, if the decode unit can dispatch one instruction per cycle, and the instruction cache can fetch two instructions per cycle, then the clock's period of the decode unit is one time-unit, and the clock's period of the instruction cache is two time-units. Thus, the present invention allows a more flexible clock design while retaining an architecture pipeline. Furthermore, the self-time delay is programmable for adjustment during testing, debugging, and system integration. The self-time delay can be adjusted to match with an external clock or an internally generated clock by using known techniques.

The self-timed clock is enabled only while valid data is being processed, which provides tremendous power savings. Most resources in complex processor design typically have less than 50% utilization. The pipeline-processing unit starts by enabling one pipeline stage at a time leading to maximum power dissipation when all the pipeline stages are operating. Inversely, the pipeline stages become idle during one, or part, of the pipeline stages at different cycles. In addition, upon an instruction exception or a branch mis-prediction, the pipeline stages can be scheduled to reset one at a time. The power surge problem relating to a power-down mode is thereby avoided.

In a synchronous design, a set of registers is used for latching data between pipeline stages. The processed data is valid at the end of the cycle and is latched into the registers using the clock edge before being processed in the next cycle by the next subsequent pipeline stage. The stall signal would conditionally refresh the registers of the current stage and all previous pipeline stages. Each pipeline stage reprocesses the same data. In contrast, using the clock design according to the present invention, between pipeline stages, multiple sets of flip-flops, which are referred to as "queue buffers", are implemented to store data and to avoid reprocessing events in the case of a stall condition. The queue buffers latch the incoming data such that a stall signal generated by the stalled pipeline stage need not propagate to all previous pipeline stages. Also, using queue buffers eliminates routing delay problems encountered between pipeline stages. The self-timed clock generates a pulse that is used for latching and for setting up data and valid bits for the next subsequent stage. Additionally, increasing the number of queue buffers further decreases power dissipation by disabling clocks of stages not processing data. During a stall condition, the clock of the stalled pipeline stage can be disabled. Since the stage output is latched in the queue buffer of the next subsequent stage, the dynamic-logic stage can remain in a precharged state during the stall cycles.

Other than using the main clock edges for transporting data between pipeline stages, the design of the self-timed clock according to the present invention contemplates generating a plurality of clock edges from the self-timed circuit. The clock edges can be programmed and conveniently used by dynamic circuits. Also, the clock edges can also be used to control various functions within a particular functional unit. Previously, the inputs to a logical block at different times causes the block to have spurious transitions that, in turn, dissipate more power. Here, the clock edges can be used to enable the logical block and/or inputs to avoid the spurious transitions. The clock edges are much more flexible in comparison to a two phase synchronous clock design. With a plurality of clock edges to choose from, the selection of a specific edge can be programmable during debugging and final testing of the processor.

The self-timed and self-enabled clock, in combination with the valid bits and queue buffers, contemplates the use of multiple inputs and an output to multiple destinations. For example, dispatched instructions can come from two different sources, the micro ROM or the decode unit.

BRIEF DESCRIPTION OF THE DRAWINGS

Other objects and advantages of the invention will become apparent upon reading the following detailed description and upon reference to the accompanying drawings, in which.

DETAILED DESCRIPTION OF THE PREFERRED EMBODIMENTS

Figure 1:
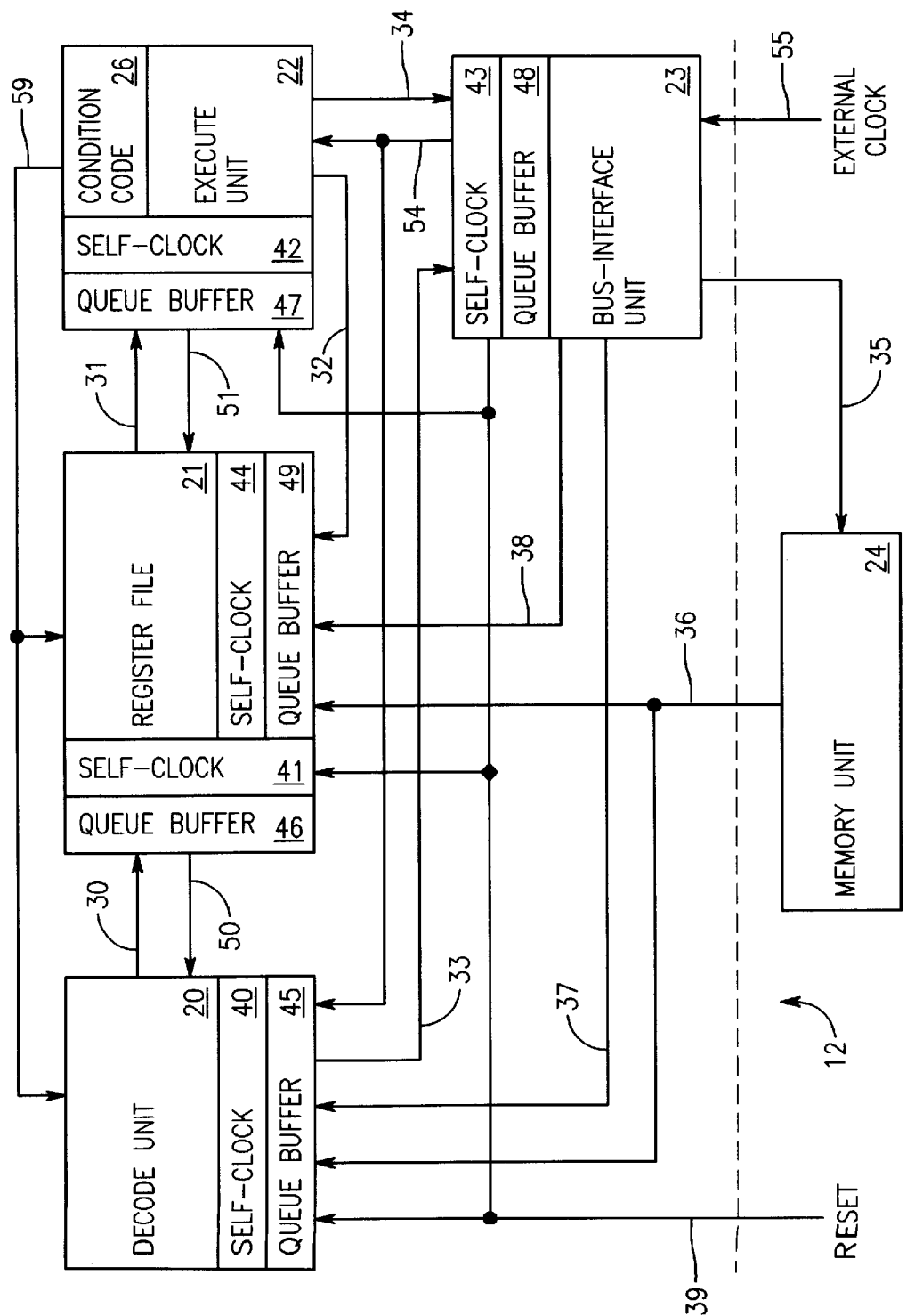
FIG. 1 is a schematic block diagram of an embodiment of a processor configured in accordance with the present invention.

In FIG. 1, an embodiment of a simple reduced instruction set (RISC) processor 12 according to the present invention, with basic functional blocks, is shown. Processor 12 includes a decode unit 20, a register file 21, an execute unit 22, and a bus-interface unit 23. An external memory unit 24 supplies instructions and data to processor 12 via bus 36. The condition code registers 26 are located within execute unit 22. Self-timed/self-enabled clock blocks (self-clock blocks) 40–44, and queue buffer blocks 45–49 are located in the functional unit blocks. The queue buffer blocks 45–49 are generally for interfacing between the functional blocks and may, in other embodiments, be a separate block apart from the respective functional unit block with which they are associated in FIG. 1.

Initially, the processor operation will be discussed without consideration of the self-clock blocks and queue buffer blocks. The details of the self-clock blocks and queue buffer blocks, which are major features for implementing the present invention to reduce power dissipation and to enhance the clock frequency of the processor, will follow. As shown in FIG. 1, the processor 12 is assumed to have five pipeline stages: i) instruction fetch by bus-interface unit 23; ii) instruction decode by decode unit 20; iii) register file 21 access; iv) instruction execution by execute unit 22; and v) writing back the result to register file 21. These pipeline stages reside within the various functional units, where the processing of data through a functional unit takes one clock cycle. In another embodiment, the pipeline stages may be part of a processing unit that is not itself a processor or a microprocessor.

In general operation, decode unit 20 sends an instruction request signal, via bus 33, to the bus-interface unit 23. The address of the instruction is also provided by decode unit 20 over bus 33. The bus-interface unit then sends the instruction request and instruction address to the external memory unit 24 via bus 35, provided there is no conflict with any data request from execute unit 22. The external memory unit 24 sends the requested instruction to decode unit 20 via bus 36. The bus-interface unit 23 also informs the decode unit 20 of the valid instruction through instruction valid signal 37. The bus-interface unit 23 is informed by the memory unit 24 when the instruction is valid from memory unit 24. As a valid instruction is received by decode unit 20, the instruction, which includes at least one byte, is decoded for the type of execution and register references. The decoded instruction byte is sent over bus 30 to the register file 21 for fetching operand data from storage in register file 21 and for setting up register dependencies.

The register dependencies refer to more than one instruction (e.g. an early and a later instruction) that read and/or write to the same register in the register file. The earlier instruction sets up the usage information of the register. If there is a dependency, then the later instruction must wait for the valid result from the previous instruction to write into the same register before it can be used by the later instruction.

Further decoding of the instruction can also be done in the pipeline stage of register file 21. The register file 21 data, along with the decoded instruction byte, are sent to execute unit 22 over bus 31. The execute unit 22 executes the instruction according to the decoded instruction type. The execute unit 22 may update the condition code registers 26, write the result back into register file 21 through bus 32, or send data request and address to bus-interface unit 23 through bus 34. The bus-interface unit then sends the data request and address to the external memory unit 24 via bus 35. The external memory unit 24 sends the requested data to register file 21 via bus 36. The bus-interface unit 23 also informs the register file 21 of the valid data through instruction valid signal 38.

In general, decode unit 20 is configured to decode instructions received from external memory unit 24. The decoding functions of decode unit 20 include decoding an execution type from an operation code byte, decoding register references, extracting immediate data, and providing control information for memory access and branch instruction. Additionally, in one embodiment, a branch prediction is included in this unit. Branch prediction is an important feature of the processor 12. The branch prediction mechanism indicates a predicted direction (taken or not-taken) for a branch instruction, allowing subsequent instruction fetching to continue within the predicted instruction stream indicated by the branch prediction. A branch instruction is an instruction which causes subsequent instructions to be fetched from one of at least two addresses: a sequential address identifying an instruction stream beginning with instructions which directly follow the branch instruction; and a target address identifying an instruction stream beginning at an arbitrary location in memory unit 24. Unconditional branch instructions always branch to the target address, while conditional branch instructions may select either the sequential or the target address based on the outcome of a prior instruction.

Instructions from the predicted instruction stream may be placed into an instruction-processing pipeline prior to execution of the branch instruction. If the predicted instruction stream is correct, then the number of instructions executed per clock cycle is advantageously increased. However, if the predicted instruction stream is incorrect, then the instructions from the incorrectly predicted stream are discarded from the instruction processing pipeline and the number of instructions executed per clock cycle is decreased. In one embodiment, decode unit 20 detects and predicts unconditional branch instructions and backward branch instructions as taken. Backward branch instruction contains the target address that is less than the current instruction address.

Upon decoding a particular instruction, if a required operand is a register location, register address information is routed to register file 21 from decode unit 20. In various embodiments of processor 12, register file 21 includes storage locations for the defined architecture registers of the instruction set. The register file 21 uses the register address to fetch data from the particular register storage. The fetched data is sent to execute unit 22 for execution. The register usage information is setup with each register in the register file 21. For a particular embodiment, the executing instruction sets the one-bit scoreboard for each referenced register in the register file 21. The one-bit scoreboard is used to indicate that an instruction will update the data after execution. Future reference to same register must wait for the result data of that instruction.

The self-clock circuit 10 can be distributed per pipeline stage or be an integral part of the pipeline stage. For example, the execution unit 22 of the processor 12 has many functions, e.g. shifter, arithmetic-logical unit, and comparator. A single self-clock circuit 10 can be used for the execution unit 22, or a plurality of self-clock circuits 10 can be used, each for a different dedicated function for the execution unit 22. Since the Out clock signal 69 of each circuit 10 is self-timed and distributed, it is possible to have different clock frequencies within the same processor 12.

For example, in one embodiment, execute unit 22 is configured to perform integer arithmetic operations of addition and subtraction, as well as shifts, rotates, logical operations, and branch operations. The operations are performed in response to the decoded byte of a particular instruction by decode unit 20. Additionally, execute unit 22 is configured to calculate the memory address for load and store memory operations performed by bus-interface unit 23. For arithmetic, logical, and shift operations, the execute unit 22 updates the condition code registers 26, which store the carry, overflow, signed, and all zeros, and sends the resulting data back to the register file 21 via bus 32. The instruction is successfully completed when it is executed and result data is written into the register file 21. A particular conditional branch uses the state of the condition code for a branch taken or not-taken decision. For the conditional branch operation, execute unit 22 checks the condition code to determine if the branch prediction is correct. Furthermore, the target address of the branch instruction is calculated in execute unit 22 and compared to the predicted address from decode unit 20. If the branch prediction is incorrect, all previous pipeline stages are cleared by the execute unit 20, via bus 59, and the new instruction request and address are sent from execute unit 22 to the bus-interface unit 23, via bus 34, which clears the bus-interface unit 23 pipeline.

Similarly, if a particular instruction causes an exception, all instructions subsequent to the particular instruction being executed may be discarded and all previous pipeline stages are cleared via bus 59. Execute unit 22 has stored within it the address of the exception routine. The request and address of the exception routine are sent from execute unit 22 to bus-interface unit 23, via bus 34. The instruction exception occurs when execute unit performs an illegal operation or encounters a preset exception condition for debugging. Examples of the illegal operation are arithmetic overflow and divide by zero. Examples of the preset exception condition are the particular memory addresses from the load and store operations. For load and store operations, execute unit 22 calculates the memory address and sends the request, address and the stored data to the bus-interface unit 23 on bus 34. For load operations, as external memory unit 24 returns the data on bus 36 to the register file 21, the bus-interface unit 23 informs the register file 21, via bus 38, that valid data is present for writing to the register file 21. For store operation, the store data is written into the external memory unit 24 via bus 35.

The register file 21 receives data from execute unit 22 and from external memory 24 for writing into the storage location indicated by the register address. Instead of waiting for data to be written into the register file 21 before fetching a newly decoded instruction, the result data bypasses the register file 21 to be input directly to execute unit 22. The register file 21 includes logic for comparing the operand register addresses of the instruction from decode unit 20 to the destination register address from execute unit 22 to enable bypassing of result data. The result data of arithmetic and logical operation is returned to register file 21 from execute unit 22 in one clock cycle. If the subsequent instruction has the result data as its operand (as both instructions reference the same register location), then the result data bypasses the register file 21 and inputs directly to the execute unit 22. With bypassing, the subsequent instruction does not wait in the register file 21 for writing of the result from execute unit 22.

On the other hand, the result data of the load operation takes extra clock cycles to access external memory 24, so the subsequent instruction may stall in the register file 21 waiting for data from external memory unit 24. Two valid results from the execute unit 22 and from the external memory unit 24 can arrive at the same time for writing into the register file 21. In one embodiment, the register file 21 has two write ports for updating its storage locations. In another embodiment, the register file 21 has a single write port for updating its storage locations. If data both from execute unit 22 and external memory 24 are received at the same time, then the data from external memory 24 will remain in the queue buffer 49 until there is no conflict. The queue buffer 49 is acting as a temporary storage location for register file 21.

The bus-interface unit 23 provides the interface between processor 12 and external memory unit 24 and performs memory operations. A memory operation is a transfer of data between microprocessor 12 and the external memory 24. Memory operations may be the result of a load/store operation that causes the data transfer or may be a request for an instruction. The request for an instruction is originated from decode unit 20 for a subsequent instruction or from execute unit 22 for a new stream of instructions.

A more detailed description of the queue buffers and self-clocks follow. In a typical prior art synchronous clock design, a single clock would provide a clock pulse to all blocks of processor 12. All pipeline stages are synchronized based on this single clock. Data passes from one stage to the next using the same clock edge. Because of the physical locations of the blocks, the clock edges are not occurring at the same time for each block, thus clock skew results. In general, the number of pipeline stages and functional blocks increase as the design becomes more complex, (e.g. for very long instruction word, superscalar, and superpipeline processors). The more complex the processor, the worse the clock skew becomes. In a similar manner, the stalling in a pipeline processing unit also effects the clock period. A stall signal from a later pipeline stage must be routed to all previous pipeline stages. For example in FIG. 1, the stall signal from execute unit 22 must be routed to register file 21, decode unit 20, and bus-interface unit 23. Inter-block dependency becomes worse as the number of pipeline stages increases.

To overcome these prior art problems and limitations, the present invention uses distributed self-timed and self-enabled clocks along with queue buffers to eliminate the clock skew and inter-block dependency problems of the synchronous central clock design. Still referring to FIG. 1, the self-clocks 40–43 independently generate the self-timed clocks for decode unit 20, register file 21, execute unit 22, and bus-interface unit 23, respectively. In addition, the self-clock 44 generates an additional self-timed clock for writing of result data into register file 21. Queue buffers 45–49 are used for latching of data between the pipeline stages. Specifically, queue buffer 45 of decode unit 20 latches instructions from external memory unit 24 upon receiving the clock pulse and valid instruction indication on bus 37 from bus-interface unit 23. Queue buffer 46 of register file 21 latches decoded instruction bytes from decode unit 20 upon receiving the clock pulse via bus 30. Queue buffer 47 of execute unit 22 latches data from register file 21 upon receiving the clock pulse via bus 31. Queue buffer 48 of bus-interface unit 23 latches request and address from execute unit 22 and decode unit 20 upon receiving the clock pulses via bus 34 and 33, respectively. Queue buffer 49 of register file 21 latches data from external memory unit 24 upon receiving the clock pulse and valid indication on bus 38 from bus-interface unit 23. Additionally, queue buffer 49 latches data from execute unit 22 upon receiving a clock pulse from bus 32.

A "full" indication from any queue buffer is used for flow control of the respective functional unit pipeline stages. A "full" indication generated in the current pipeline stage stops the previous pipeline stage from processing the next data event in the next cycle and outputting it to the current pipeline stage by generating a stall condition within the previous pipeline stage. In a particular embodiment, the output clock pulse of the current pipeline stage is fed back to the previous stage for synchronization and for restarting the operation of that previous stage, which has been stalled. Specifically, the "full" indication signal and the clock pulse of bus-interface unit 23 are fed back to decode unit 20 and execute unit 22 via bus 54. The full indication and the clock pulse of register file 21 are fed back to decode unit 20 via bus 50. The full indication and the clock pulse of execution unit 22 are fed back to register file 21 via bus 51. Additionally, the external clock 55 is coupled to bus-interface unit 23 for synchronization of the internal clock for bus-interface unit 23. An externally generated reset 39 is coupled to all blocks for initialization.

In general, where a stall condition exists for the current operation in any block 20–23 of processor 12, the queue buffer 45–49 associated with the stalled block stores the incoming data from the prior stage until the stall condition resolves. The stall signal, generated in the current block 20–23, does not traverse all previous pipeline stages, as with a synchronous central clock system of the prior art. As discussed previously, as the respective queue buffer 45–49 fills with data, a "full" signal, generated by that queue buffer, is used to stall the previous pipeline stage to prevent any additional data from being output to the stage having the full buffer. The "full" signal, unlike the stall signal, is not from a speed path circuit.

Using a queue buffer in a stall condition can eliminate the inter-block dependency which can adversely effect the over all clock frequency. For example, specifically to processor 12 of FIG. 1, a register dependency condition exists when a particular instruction from decode unit 20 requires operand data from a storage location in register file 21 that will be updated from an earlier load instruction. The load instruction must fetch data from external memory unit 24 that may take several cycles. The dependency checking logic (not shown) of register file 21 detects this dependency condition and generates a stall signal. The current particular instruction cannot be sent to execute unit 22 until data is received from external memory unit 24. The current instruction must be refreshed in the register file 21 and all incoming instructions must be placed into the queue buffer 46 until it is full, which causes a "full condition" discussed above. Without the queue buffer 46, the register file stall signal needs to traverse from the register file 21 to decode unit 20 and stop the decode unit 20 from advancing to the next instruction. Without the queue buffer 46 and 45, the register file stall signal needs to traverse to bus-interface unit 23 to re-fetch the same instruction from external memory 24. The register file stall signal is from a speed path circuit, i.e. the dependency checking logic of register file 21, with additional routing to decode unit 20 and to bus-interface unit 23, the overall clock frequency will be effected. As the queue buffer 46 in register file 21 becomes full, a full signal is sent to decode unit 20 via bus 50. Similarly, as the queue buffer 45 in decode unit 20 becomes full, a full signal is sent to bus-interface unit 23 and no other request is made on bus 33 for additional instructions.

Regarding the self-clocks, initially, all functional blocks are inactive. After initialization, the bus-interface unit 23 is enabled to make an instruction request to external memory unit 24. The self-clock 40 and decode unit 20 are inactive until a clock pulse and valid instruction indication is received from bus-interface unit 23 via bus 37. At that time, decode unit 20 is enabled to decode instruction and the self-clock 40 is enabled to generate a clock pulse. The clock pulse and valid decoded instruction byte are sent on bus 30 to register file 21. The register file 21 and the self-clock 41 are enabled for accessing data and generating a clock pulse. The register file data and clock pulse are sent on bus 31 to enable the self-clock 42 and execute unit 22. The clock pulse and valid result from execute unit 22 are sent on bus 32 back to register file 21. The self-clock 44 of register file 21 is enabled for writing result data into the storage in register file 21. In addition, a clock pulse and memory request from execute unit 22 can be sent on bus 34 to bus-interface unit 23. The self-clock 43 and bus interface unit 23 are enabled to send a data request to external memory unit 24 via bus 35. With valid data from external memory unit 24, the valid indication and clock pulse from bus-interface unit 23 are sent to enable the self-clock 44, via bus 38, for writing data into the storage of register file 21. Since, in general, the functional units 20–23 and the self-clock units 40–44 are enabled only with valid data for execution, the power dissipation of the processor is minimized. The clock can be customized for use directly from one pipeline stage to the next, the clock skew is virtually eliminated in this invention.

Another advantage of this invention is gracefully increasing or decreasing power dissipation by processor 12. The pipeline stages are enabled one at a time as described in the above discussion. From initialization, bus-interface unit 23, decode unit 20, register file 21, and execute unit 22 are enabled one at a time, respectively. On the other hand, with the distributed clock embodiment according to this invention, the execute unit 22 can schedule to reset one pipeline stage at a time for a branch misprediction or an instruction exception, instead of automatically clearing all previous pipeline stages in the functional units, as described above, by starting from decode unit 20 and then register file 21 via bus 59. The queue buffer 47 of execute unit 22 is blocked from accepting a new instruction from register file 21 until resetting of the register file is completed. The power dissipation of processor 12 is increased and decreased gracefully, thus avoiding the problem of power surge, noise, and electro-magnetic interference related to the synchronous clock design of the prior art.

Figure 2A:
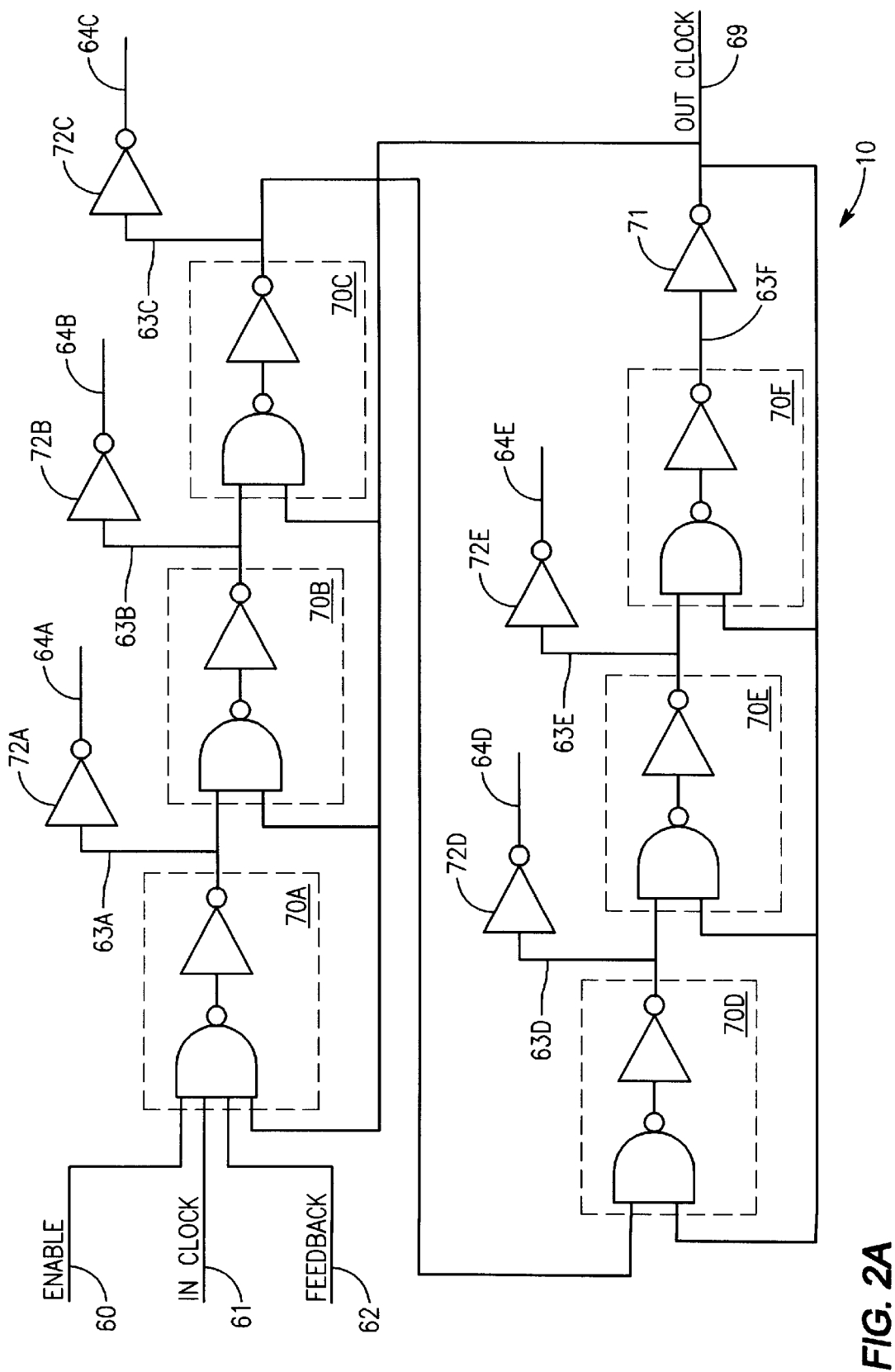
FIGS. 2a and 2b are schematic and timing diagrams, respectively, for an embodiment of the self-timed and self-enabled clock for generating the clock pulse and plurality of clock edges according to the present invention.
Figure 2B:
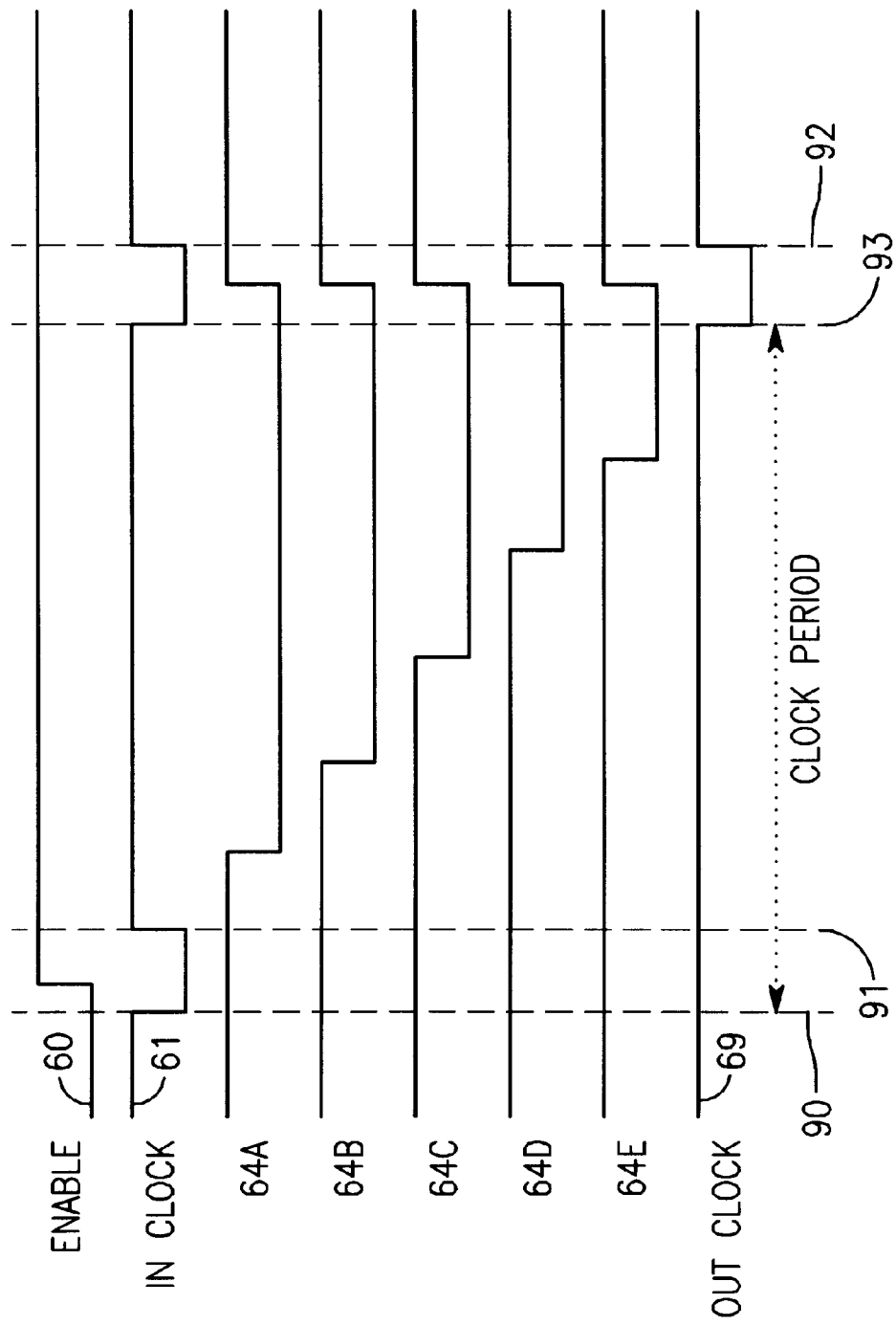

Referring to FIGS. 2a and 2b, an embodiment of the self-clock circuit 10 and its timing diagram are shown. The self-clock circuit 10 is the same for each self-clock block 40–44 and is designed to generate a negative pulse, denoted "out clock" (output node 69) in FIG. 2b, at the end of the clock cycle. Self-clock circuit 10 includes input nodes 60, 61, and 62, which are for inputting, respectively, an enable signal, an input clock and a feedback clock. A delay chain for self-clock 10 includes a plurality of NAND gate and inverter pairs 70A–70F, an inversion gate 71 prior to output node 69. The NAND gate and inverter pairs 70A–70F are herein referred to as delay units. The plurality of delay units 70A–70F have corresponding output nodes 63A–63F which connect the delay units 70A–70F and inversion gate 71. Nodes 63A–63E are coupled to inversion gates 72A–72E for generating of plurality of falling clock edges present on outputs 64A–64E, depicted in FIG. 2b, which are used to control logic within a functional unit associated with that self-clock. The enable signal on input node 60 indicates valid data from a previous pipeline stage of a functional unit, the input clock on input node 61 is the input clock pulse from a previous pipeline stage, and the feedback clock on input node 62 is a pulse from the next subsequent pipeline stage indicating reception of valid output data from the current stage.

During initialization, the enable signal on node 60 (FIG. 2a) is de-asserted, causing all intermediate signals on nodes 63A–63F to transition to a logic low level and causing the out clock signal on output node 69 to transition to a logic high level. The enable signal on input node 60 is asserted when the input clock on input node 61 is active low. The high-to-low transition of the input clock on input node 61 occurs at hashed reference line 90 of FIG. 2b. The self-clock circuit 10 is not operational until the low-to-high transition of input clock 61, which occurs at hashed reference line 91 of FIG. 2b. The delay is propagated through the delay units 70A–70F with signals 63A–63F transiting to the high level. Output signal 69 transitions to the low level, which is the beginning of a new clock cycle (line 93 of FIG. 2b). The clock period for a self-clock circuit 10 is the time between the high-to-low transitions of the Out clock (FIG. 2b). Out clock 69 causes all internal signals 63A–63F to reset to the low level. Unless there is another clock pulse from In clock 61, the enable signal 60 will be de-asserted by the transition high-to-low of Out clock 69 causing the self-clock circuit 10 to be inactive.

If In clock 61 is active, then the enable signal 60 remains asserted. For this cycle, the self-clock circuit 10 is started when both the In clock 61 and Out clock 69 transition from low-to-high, occurring at hashed reference line 92 of FIG. 2b. The current self-clock circuit 10 is synchronized with itself and with the previous pipeline stage self-clock circuit 10. The Out clock 69 is used by the next subsequent pipeline stage as the In clock. In the next cycle, the self-clock of the next subsequent pipeline stage generates the feedback pulse 62 similar to that of the Out clock pulse 69 of the current pipeline stage. If enable signal 60 remains asserted, then the self-clock circuit 10 is started when In clock 61, feedback 62, and Out clock 69 transition from low-to-high. Now, the current self-clock circuit 10 is synchronized with itself and with the self-clocks of the previous and the next subsequent pipeline stages. Because of this synchronization, a small mismatch in the self-clocks is not a problem, but it is desirable to have matching delays through all self-clocks. The design ensures that the current, previous, and next subsequent pipeline stages are synchronized. The final stage, i.e. the bus-interface unit 23, can use external clock 55 (FIG. 1) as the feedback input 62.

The internal clock period of the self-clock, measured from hashed lines 90–93 of FIG. 2b, can be slightly less than that of the external clock 55. Another function of the feedback 62 is to wake up the stalled pipeline stage. The feedback 62 can enable the enable signal 60 of the stalled pipeline stage. This type of operation would be the reverse of the above discussed forward operations since the pipeline stage which causes the primary stall condition uses its own Out clock as the feedback clock to wakeup the previous pipeline stage, which in turn wakes up the stage prior to the previous stage. The self-clock circuit 10 is designed to match the worst-case speed path delay of a functional unit (FIG. 1) by increasing or decreasing the number of NAND gate and inverter pairs (FIG. 2a). The pulse width of the Out clock 69 is adjusted by increasing or decreasing the delay of the inversion gate 71, where inversion gate 71 may otherwise be referred to as a pulse shaper circuit.

The overall delay selected for Out clock 69 must take into account the routing delay to the next subsequent pipeline stage and the extra logic gates (not shown) for qualifying the Out clock. The self-clock circuit 10 can be designed to have more than one Out clock having different delays for multiple blocks. For example, execute unit 22 generates two different out clocks with different delays, one for register file 21 and one for bus-interface unit 23. The valid indications are used for qualifying the Out clocks to register file 21 or bus-interface unit 23.

Referring to FIG. 2b, in addition to the Out clocks, the plurality of falling clock edges for outputs 64A–64E shown between hashed lines 91 and 93 can be used to control dynamic logic of the functional unit associated with the self-clock 10 and to process data with much more flexibility by choosing any of the outputs 64A–64E. It is understood that in another embodiment having non-inverted outputs, rising edges could be used instead of falling edges. The dynamic logic can select the clock edges according to it is timing requirements. Furthermore, the selection of the clock edges can be programmable for use during debugging of silicon and general testing. The plurality of clock edges are convenient for use in cascading dynamic logic circuits within a functional unit.

Additionally, the falling clock edges of outputs 64A–64E contemplates that they be used to enable or clock scheduled events within a functional unit. One source of power dissipation within the functional unit of the prior art is due to spurious transitions of logic. As an example, when inputs arrive at different times to a functional block, the block processes data more than one time. If the control signal to the arithmetic-logical unit (ALU) is slower than input data, then the ALU may start with one function before changing to the correct function. According to the present invention, the falling clock edge can be used to enable the ALU or input data at later time, which eliminates spurious transitions of logic.

Figure 3A:
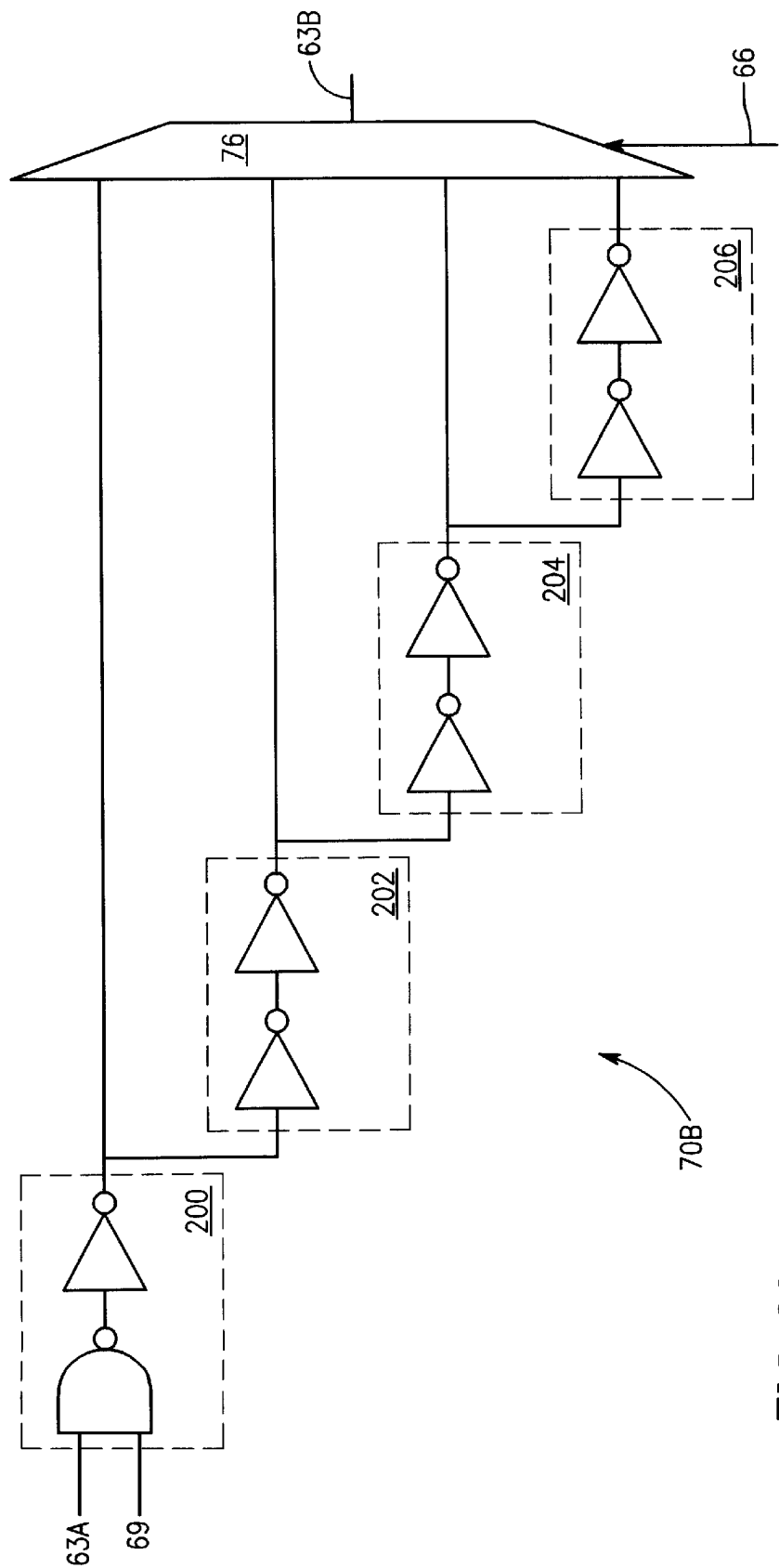
FIG. 3a is schematic of a portion of the self-timed circuit of FIG. 2 with programmable logic to increase or decrease the clock period.

The Out clock of the self-clock design of FIG. 2a may not match with the external clock 55 (FIG. 1) due to processing variants. The self-clock design includes a programmable delay during initialization of the processor 12, so the periods can be matched. Referring to FIG. 3a, the delay unit 70B is illustrated in greater detail. It should be understood that for each self-clock circuit 10, only one of the plurality of delay units 70B–70E includes the delay unit circuitry of FIG. 3a. Regardless of which delay unit 70B–70E includes the FIG. 3a circuitry, the circuitry would be the same. Delay unit 70A could also include the same circuitry as shown for delay unit 70B in FIG. 3a, but in that case fixed delay unit 200 of FIG. 3a would include additional inputs to account for the multiple inputs shown in FIG. 2a for delay unit 70A. For the circuit of FIG. 3a, the variable delays 202–206 are in addition to the fixed delay unit 200. Four selectable delays are used in this example with the output from each delay unit being input to multiplexor (MUX) 76, but the number of selectable delays can vary according to the process technology and/or implementation specifics. Selection of the appropriate delay to match the external clock 55 is accomplished by a signal on select input 66 of MUX 76.

Figure 3B:
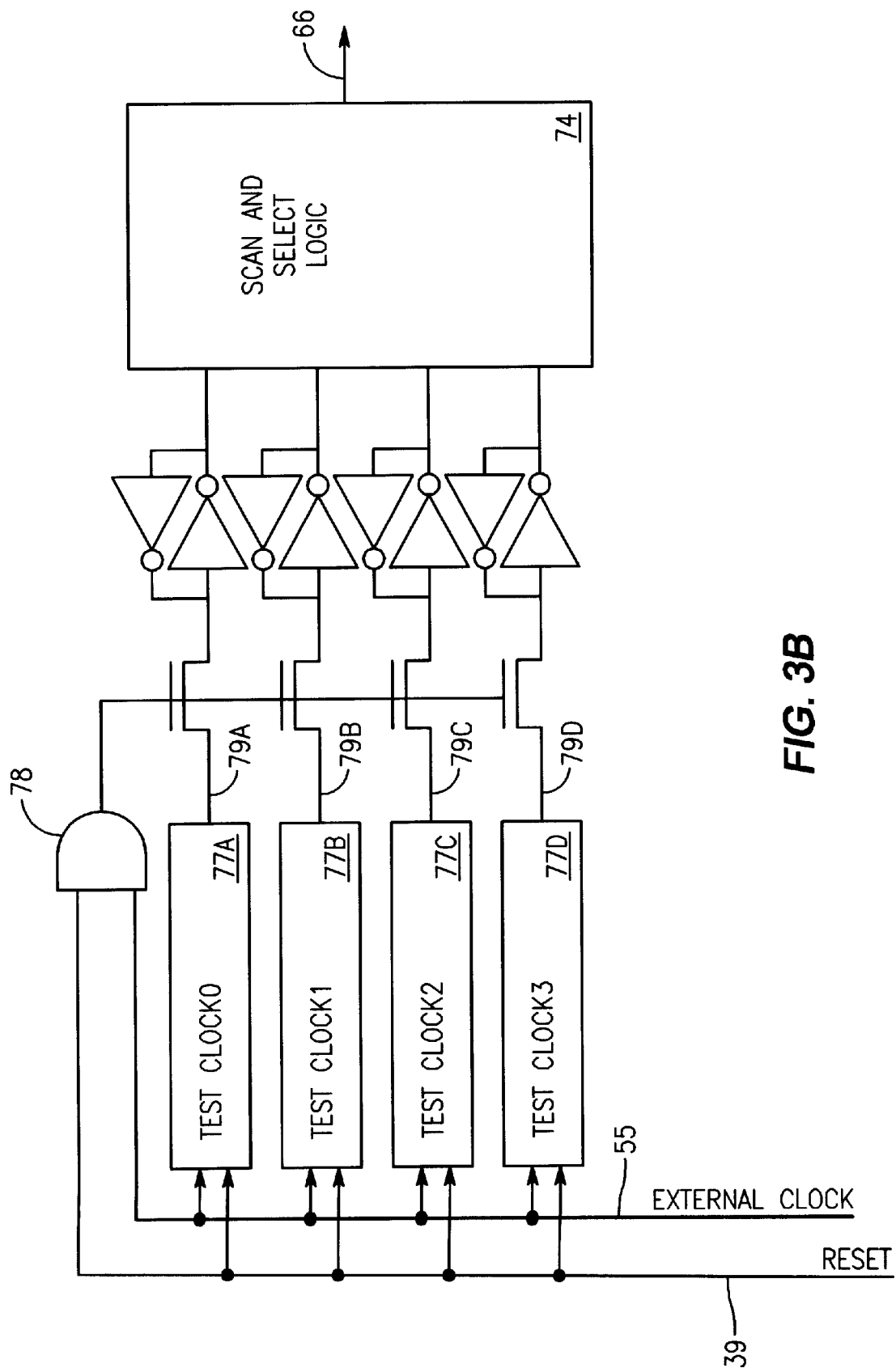
FIGS. 3b and 3c are schematic and timing diagrams, respectively, of an embodiment of the logic for selecting the programmable delay of the self-clock of FIG. 3a to match an external clock's period.

Turning now to FIG. 3b, an embodiment of logic for generating the select signal 66 for MUX 76 during initialization, or reset, is depicted. One of the test clocks 77A–77D is selected such that the end of its period occurs approximately at the same time as the end of the period of the external clock 55, according to the worst and best cases of process technology. In the FIG. 3c example, the end of the period of external clock 55 occurs at hashed line 96. Test clock 77B is selected because its period ends just slightly prior to, but most approximately equal to, the end of period for external clock 55.

Figure 3C:
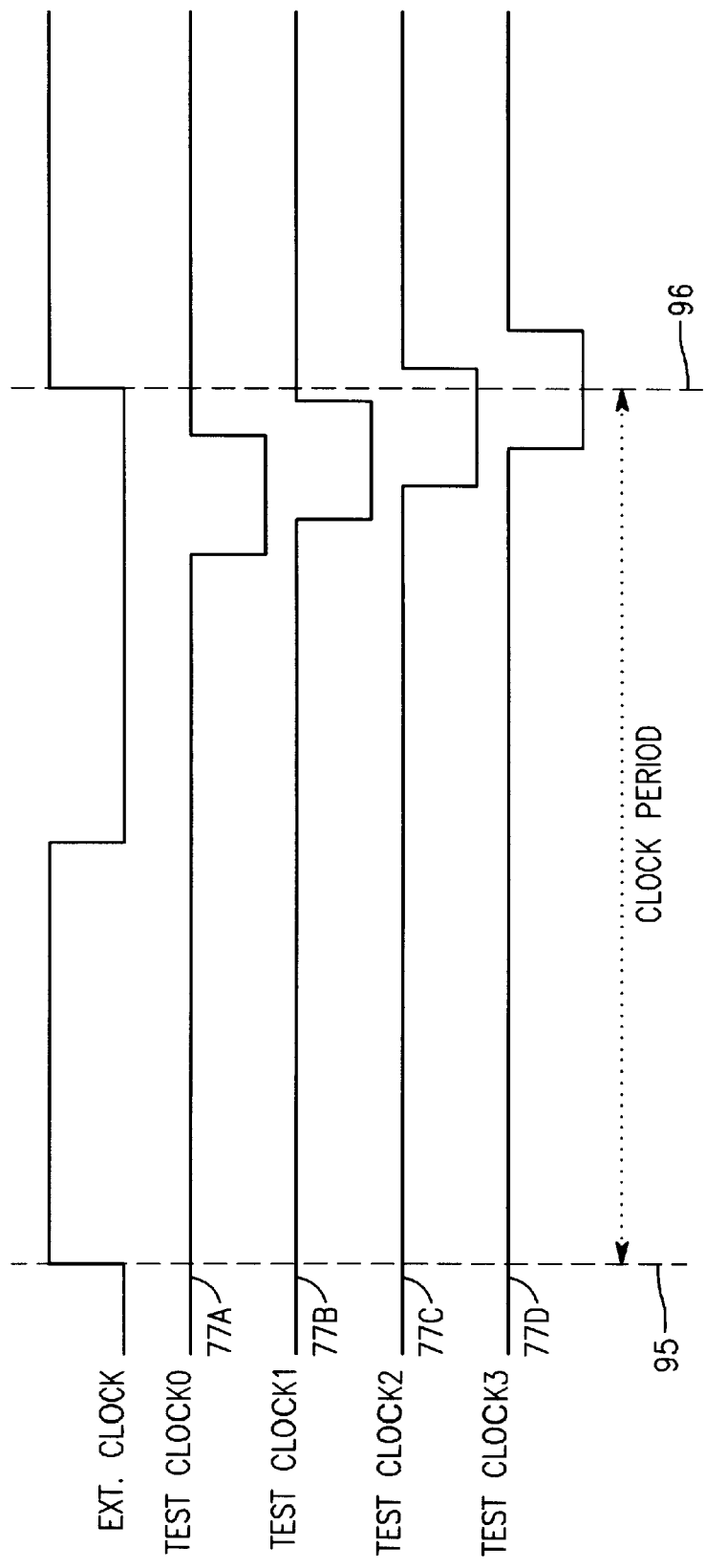

The test clocks 77A–77D are enabled by the external clock 55 and reset signal 39, and generate clock pulses, shown in FIG. 3c, having as identical delays as possible Out clocks of self-clock circuit 10, which depends on the clock selected for the circuit of FIG. 3a. Specifically, the test clock 77A has the same frequency as the Out clock 69 of self-clock circuit 10, where test clock 77A includes the output from unit delay 200 and, if selected, is output from MUX 76 of FIG. 3a. Test clock 77B has the same frequency as the Out clock 69 of self-clock circuit 10, where test clock 77B includes the output from unit delay 202 and, if selected, is output from MUX 76. Test clock 77C has the same frequency as the Out clock 69 of self-clock circuit 10, where test clock 77C includes the output from unit delay 204 and, if selected, is output from MUX 76. Test clock 77D has the same frequency as the Out clock 69 of self-clock circuit 10, where test clock 77D includes the output from unit delay 206 and, if selected, is output from MUX 76. The frequency of the test clocks can be a multiple of the external clock 55, or, in another embodiment, may be equal to that of external clock 55. In another embodiment, the Out clock 69 for self-clock circuit 10 is the internal clock for processor 12. The Out clock 69 for any self-clock circuit 10 can be a multiple of the Out clock 69 of any other self-clock circuit 10 of processor 12 (FIG. 1).

In a further embodiment, a signal other than the reset signal 39, e.g. a timer output for synchronizing the test clocks at defined intervals, can be used to enable the select logic of FIG. 3b. The AND gate 78 uses the external clock 55 and reset signal 39 to capture the state of the output of the test clocks 77A–77D in the latches 79A–79D, respectively. The scan and select block 74 scans its inputs and selects the test-clock output which has a rising edge just prior to the rising edge of the external clock, shown at hashed line 96 of FIG. 3c. This selected test clock becomes the select input 66 for MUX 76 of FIG. 3a.

FIG. 3c is the timing diagram of the select logic in FIG. 3b. The external clock's period is the time between the two hashed lines 95 and 96. At the low-to-high transition of the external clock 55 at line 95, the test clocks are enabled to generate a clock pulse. In this example, test clocks 77A and 77B have a rising edge occurring prior to the rising edge of the external clock 55 at line 96, while test clocks 77C and 77D have a rising edge occurring subsequent to the rising edge of external clock 55. In this embodiment, the rising edge of external clock 55 and of the test clock 77A–77D are the controlling clock edge. After being inverted by the latch inverters, the low state of test clocks 77A and 77B, and the high state of test clocks 77C and 77D are latched into the latches 79A–79D. The scan and select logic block 74 scans the outputs of latches 79A–79D to generate select input 66 which is used to select the self-clock, via MUX 76, having the same delay as test clock 77B, which was the selected test clock, for all self-clocks in processor 12. Test clock 77B was selected by scan and select logic 74 because its trailing edge, here the rising edge, occurs closest in time, but prior to, the rising edge of external clock. Select input 66 enables the MUX 76 to select the input which includes unit delays 200 and 202 of FIG. 3a.

Figure 4:
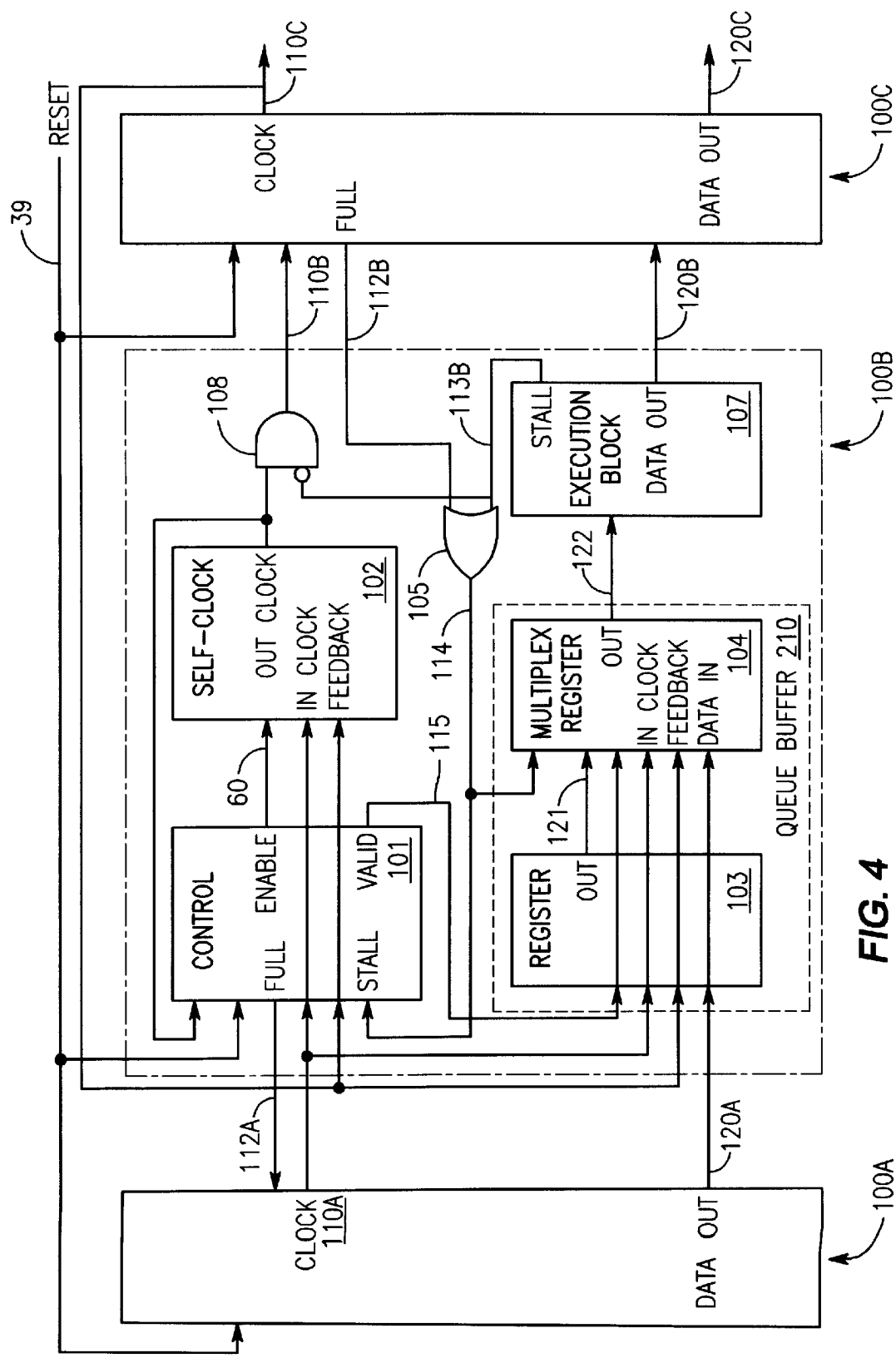
FIG. 4 is schematic illustrating three pipeline stages, having a self-clock and queue buffer, that represents an embodiment of the operations through the pipeline stages of the processor of FIG. 1.

Turning now to FIG. 4, a block diagram of an embodiment of three simple pipeline stages is shown. The details and interaction between pipeline stages of a processor 12 can be best explained by reference to FIG. 4. The three pipeline stages are representative of three consecutive pipeline stage of the processor 12. In this example, the number of registers making up queue buffer 210 is two, with one register 104 for latching the current event and another register 103 for latching an extra incoming data event. The block diagram consists of three pipeline stages, 100A–100C, each pipeline stage consists of the control block 101, the self-clock 102, the register 103, the multiplex register 104, and execute block 107. The self-clock 102 is the same as the self-clocks 40–44 previously illustrated and discussed in reference to FIG. 1. The register 103 and multiplex register 104, in combination, comprise the queue buffers 45–49 previously illustrated and discussed in reference to FIG. 1.

Execute block 107 executes a data event by performing whatever function is necessary to execute that event.

The stall signal 114 originates from two different sources, both of which are input to OR gate 105. "Full" indication signal 112B of the next subsequent pipeline stage 100C is one input to OR gate 105. The other input to OR gate 105 is internally generated stall signal 113B of execute block 107. The control block 101 includes similar inputs as with the self-clock 102 of FIG. 2a. The control block 101 generates an enable signal 60 for the self-clock 102 and controls latching of data in the queue buffer 210 by use of valid input signal 115. The control block 101 stores the valid input signal bits 115 for the queue buffer 210. The self-clock 102 is enabled if there is a valid data in control block 101, a data valid signal bit 115 is present, and there is no stall condition.

The register 103 is the second entry of the queue buffer 210, which latches the incoming data out 120A output from previous pipeline stage 100A, in case of a stall condition, but otherwise receives no data. The multiplex register 104 is the first entry of the queue buffer 210 and performs one of the following function: 1) refreshes the current data 122 during a stall condition; 2) latches data 121 from the register 103 when there is no stall condition and when valid data signal 115 is present, indicating register 103 data is valid; or 3) latches the incoming data which is data out 120A when there is no stall condition and when register 103 has invalid data. The valid data signal 115, which is two bits wide in one embodiment, and the stall signal are used as the control for selection of data input to multiplex register 104.

Execute block 107 executes output data 122 from the multiplex register 104 in the next cycle. The current pipeline stage 100B receives input clock pulse 110A and data out 120A from the previous pipeline stage 100A and receives feedback clock pulse 110C and stall signal 112B from the next subsequent pipeline stage 100C. The global reset signal 39 is used to reset the valid data signal 115 of all pipeline stages simultaneously upon a reset, or initialization.

Figure 5:
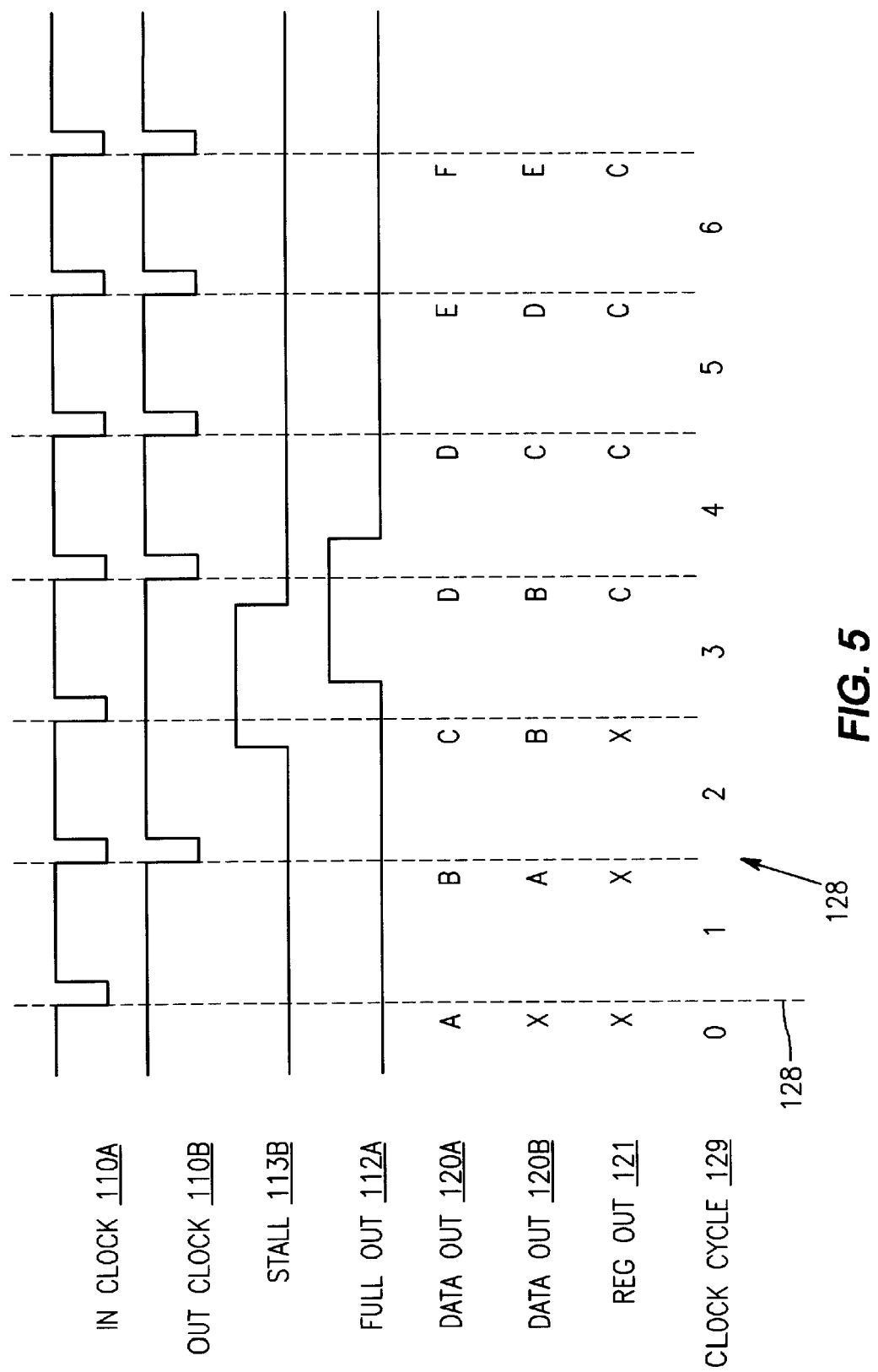
FIG. 5 is timing diagram for the operations of the three pipeline stages of FIG. 4.

The example can be understood by timing diagram shown in FIG. 5. The timing diagram represents the operation, status, and conditions the current pipeline stage 100B. The stream of events is shown according to one embodiment of the current pipeline stage 100B. The data input stream, which is data out 120A, includes a plurality of consecutive events represented by the letters A through F. Event A is the foremost in the event stream of data out 120A followed by event B, etc. For the timing diagram of FIG. 5, the clock cycle time 129 is depicted between a pair of hashed vertical lines, each having reference number 128. Each clock cycle 129 is numbered from 0 to 6 at the bottom of the timing diagram, indicating a separate consecutive clock cycle.

During clock cycle 0, the falling edge of input clock pulse 110A is received along with the input data event A. The event A is latched into the multiplex register 104 and one valid data signal 115 bit is set in the control block 101. The control block 101 enables the self-clock 102 to generate a negative clock pulse 110B in clock cycle 1. The event A is presented to the execute block 107 in clock cycle 1.

Similarly, in clock cycle 1, a second negative clock pulse 110A is received along with data input event B. The incoming data event B is latched into the multiplex register 104 and its valid data signal 115 bit remains set. The data event B is presented to the execute block 107 in clock cycle 2. If there is no input clock pulse 110A, then the valid data signal 115 bit for the multiplex register 104 will be reset by its own self-clock signal 110B and no clock pulse is generated by self-clock 102 in clock cycle 2.

During the clock cycle 2, execute block 107 generates a stall signal 113B which causes data event B to refresh in the multiplex register 104. The input clock pulse 110A is received along with incoming data event C. Since the multiplex register 104 is busy refreshing data event B, the data event C is latched in the register 103 and its valid data signal 115 bit is set. Both valid data signal 115 bits of the queue buffer 210 are set. Data event C will appear at the output 121 of register 103 in clock cycle 3. Current pipeline stage 100B is stalled, but previous pipeline stage 100A is allowed to move forward to process the next data event. The "full" signal 112A is generated for the previous pipeline stage 100A in clock cycle 3. Without register 103 of the queue buffer 210, the stall signal 113B, which may originate from a speed path circuit of execute block 107, must travel to stall the previous pipeline stage 100A and refresh data event C for clock cycle 3. The "full" signal 112A is known early in clock cycle 3, but it does not effect the clock period as does the stall signal 113B.

In the clock cycle 3, the stall signal 113B is deactivated, causing the data events to move forward in clock cycle 4. Event B is processed in clock cycle 3 to completion unless the stall signal 113B is reasserted. The "full" signal 112A is asserted in clock cycle 3, causing data event D to refresh in previous pipeline stage 100A for another clock cycle. The previous pipeline stage 100A is responsible in clock cycle 4 to refresh data event D as the current pipeline stage 100B refreshes data event B. At the clock pulse 110B at the beginning of cycle 4, data event C moves from register 103 to multiplex register 104. The valid data signal 115 bit for register 103 will be reset.

In the clock cycle 4, the stall signal 112A is deactivated allowing events to move forward in the previous pipeline stage 100A. The data event D is latched in the multiplex register 104 of the current pipeline stage 100B and its valid data signal 115 bit remains set. All pipeline stages resume their normal operations with one data event per clock cycle in subsequent clock cycles 5 and 6. In this embodiment, as long as a valid data signal 115 bit is set, the enable signal 60 is asserted by the control block 101 and the Out clock 110B is activated. During the stall cycles, the In clock 110A is necessary for multiplex register 104 to latch input data event D when multiplex register 104 is available. The self-clock 102 must be activated during the stall cycles. Referring to FIG. 4, the Out clock 110B can be qualified at AND gate 108 by stall signal 113B, since the output data 120B is not valid for latching by the next subsequent pipeline stage 100C, as shown in FIG. 5, where there is no Out clock 110B pulse between clock cycles 2 and 3. In another embodiment, addition of another entry in the queue buffer 210 allows the self-clock of each pipeline stage in each functional unit to be idle during the stalled cycle, as shown later in regard to FIG. 7.

Figure 6:
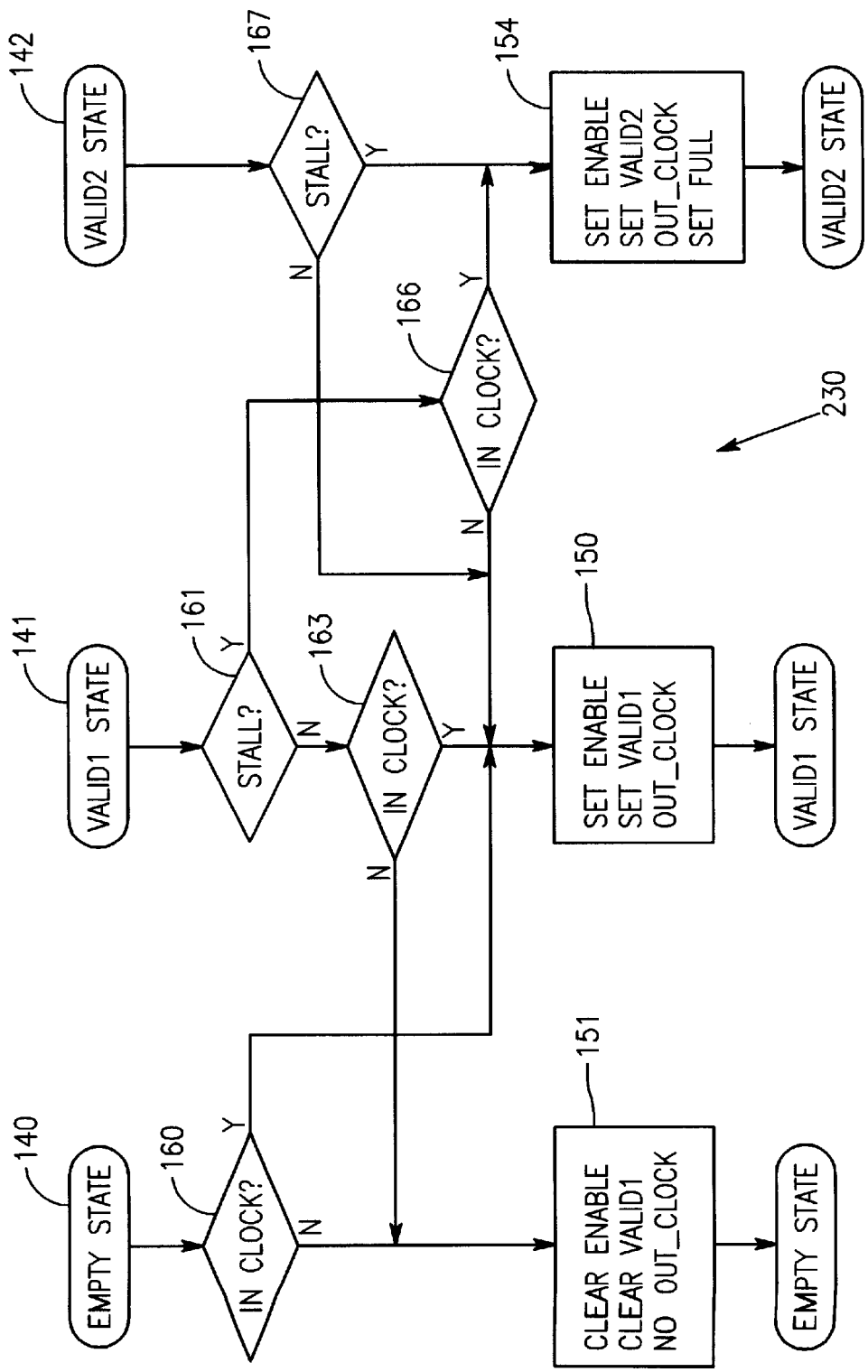
FIG. 6 is flow diagram of the control block of FIG. 4 for enabling the self-clock and setting the valid bits of the queue buffers.

Turning now to FIG. 6, a flow diagram of a state machine 230 for the control block 101 in FIG. 4 is shown. From initialization, the state machine 230 is in empty state 140. In decision block 160, if there is no In clock 110A, then the current pipeline stage 110 remains in an empty state as depicted in block 151. As In clock 110A is asserted, the current pipeline stage moves to Valid1 state 141 after it sets enable signal 60 for self-clock 102 and valid data signal 115 bit for multiplex register 104, and latches input data, which is data out 120A, in multiplex register 104, in block 150.

In Valid1 state 141, if the stall signal 114 is asserted in decision block 161, then In clock 110A of decision block 166 causes the current pipeline stage to remain in the Valid1 state, as depicted in block 150, or moves to the Valid2 state, as depicted in block 154. In the Valid2 state, there is valid data in both register 103 and multiplex register 104, and respective valid data signal 115 bits set for each. If the stall signal 114 and In clock 110A in decision blocks 161 and 163 are not asserted, then the Out clock 110B pulse causes the current pipeline stage to return to the empty state, as depicted by block 151. If the In clock 110A of the decision block 163 is asserted, then the current pipeline stage remains in the Valid1 state, as depicted in block 150.

Valid2 state block 142 depends on the stall signal 114 in decision block 167 to remain in the Valid2 state, as depicted by block 154, or return to the Valid1 state, as depicted by block 150.

Figure 7:
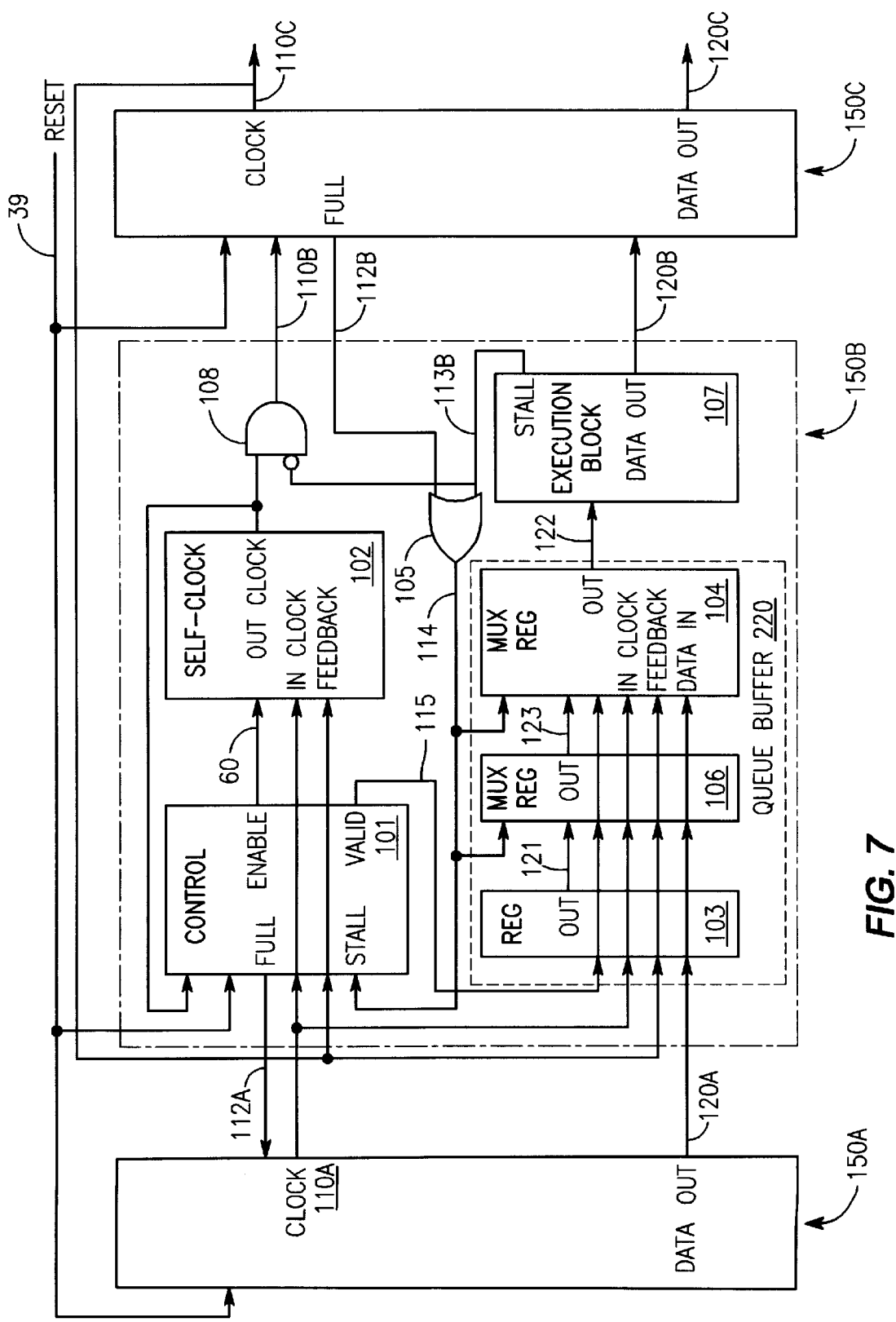
FIG. 7 is schematic illustrating the three pipeline stages of FIG. 4, having an alternative embodiment for a self-clock and queue buffer.
Figure 8:
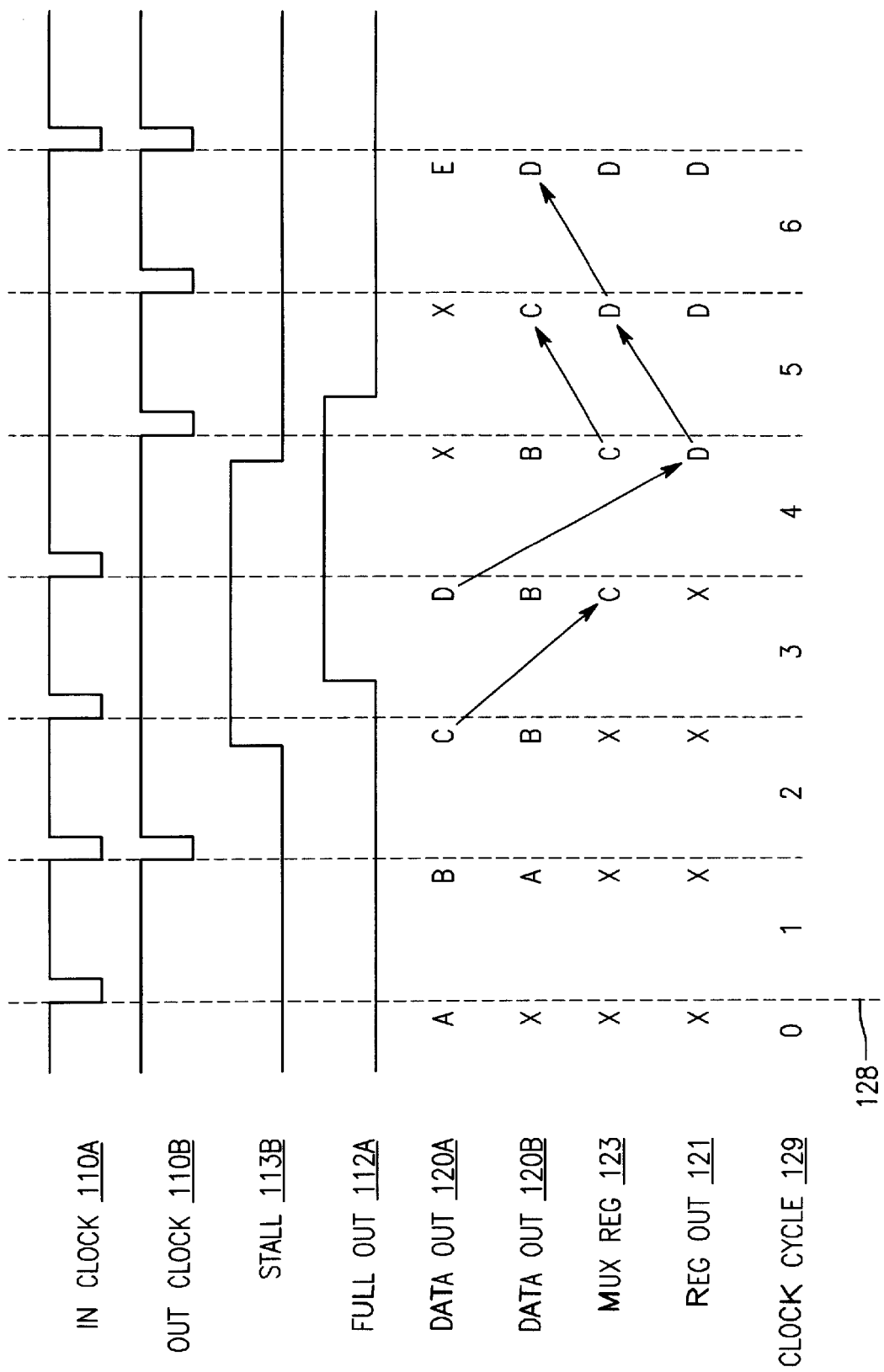
FIG. 8 is timing diagram for the operations of the three pipeline stages of FIG. 7.

In the example of FIG. 5, as long as the valid data signal 115 bit for the multiplex register 104 of the previous pipeline stage 100A is set, the In clock 110A pulse is asserted every clock cycle and the data event is refreshed. If static logic is used in the execute block 107, then processing the same data does not cause any gate to change state and power dissipation is only caused by the clock pulses 110A. If dynamic logic is used in the functional unit, then the data event must be reprocessed and power dissipation remains the same during stall cycles. In either case, to further reducing power dissipation, another multiplex register is added to the queue buffer 210 to latch the incoming data, which is data out 120A, so the self-clock 102 and the execute block 107 can be disabled during the stall cycles. FIGS. 7 and 8 illustrate an embodiment and associated timing diagram for such a scheme.

Turning now to FIG. 7, the architecture is similar to that of FIG. 4, with an additional multiplex register 106 in each of the pipeline stages 150A–150C. The control block 101 generates an extra valid data signal 115 bit for controlling of the multiplex register 106. The multiplex register 104 selects input 123 from multiplex register 106 or input data out 120A from previous pipeline stage 150A. The multiplex register 106 selects input 121 from register 103 or input data out 120A from previous pipeline stage 150A.

FIG. 8 is the timing diagram of the current pipeline stage 150B. The timing is similar to that of previous example of FIG. 5, with the exception of the stall cycles. Here, during clock cycle 0 and 1, the same operations and clock pulses as in FIG. 5 are generated. In clock cycle 2, the stall signal 113B is asserted causing the data event B to be refreshed. Event C is latched into the multiple register 106 and its valid data signal 115 bit is set. Event C appears at the output 123 of the multiplex register 106 in clock cycle 3.

In the clock cycle 3, the "full" signal 112A is asserted for previous pipeline stage 150A. This signal is too late for previous pipeline stage 150A to stop the data event D from processing. Data event D is latched into register 103 of current pipeline stage 150B. The stall signal 113B remains asserted, causing the data events to stall in the current pipeline stage 150B for another cycle. All valid data signal 115 bits remain set in control block 101. In clock cycle 4, the clocks 110A and 110B of pipeline stages 150A and 150B can be deactivated until the signals 113B and 112A are respectively deasserted.

In the clock cycle 4, the execute block 107 triggers the control block 101 to restart the self-clock 102. Event B is processed in this clock cycle to completion unless the stall signal 113B is reasserted. If stall signal 113B remains asserted, then there will be no change in the current pipeline stage 150B. Out clock 110B pulse is generated along with data event B on output 120B for the next subsequent pipeline stage 150C. The clock pulse 110B causes event C to move to the multiplex register 104 and causes data event D to move to the multiplex register 106. The valid data signal 115 bit of register 103 is reset. The "full" signal 112A remains asserted in this clock cycle causing the previous pipeline stage 150A to be idle. The previous pipeline stage 150A can continue to accept input data events until its queue buffer is full, but it will not process any event nor activate its self-clock.

In the clock cycle 5, events in the queue buffer 220 of the current pipeline stage 150B moves forward and returns to the same state as in clock cycle 1. Data event D moves from multiplex register 106 to multiplex register 104 in the clock cycle 6, unless the stall signal 114 is asserted. The "full" signal 112A is deactivated in clock cycle 5 so the next data event in previous pipeline stage 150A can be processed in clock cycle 66.

In the clock cycle 6, the Out clock 110B pulse at the beginning of clock cycle 6 is used as a feedback to previous pipeline stage 150A to wakeup its self-clock and its functional unit. Data event E will appear at the data out 120A output from previous pipeline stage 150A at the end of clock cycle 6. Current pipeline stage 150B processes its last data event, which was in the queue buffer 220 during the stalled cycles. Current pipeline stage 150B now resumes the normal flow of one data event per clock cycle through the pipeline stages. With this embodiment of the queue buffer 220, the self-clock 102 and execute block 107 are disabled during the stalled cycles, which can significantly reduce power dissipation for a pipeline stage.

In general, the pipeline stage which originates the stall condition is responsible to reactivate its functional unit and to generate the feedback clock to the previous pipeline stage. For example, referring to the processor 12 of FIG. 1, if a stall condition occurs from the read operand dependency in the register file 21, then self-clock 41 generates no Out clock 69 until valid data exists on bus 36 and a clock pulse from bus-interface unit 23 on bus 38 are received by register file 21. The clock pulse on bus 38 activates the self-clock 41 and the dependency checking logic of register file 21. The stall condition can be reasserted if the dependency remains. The Out clock of self-clock 41 is the feedback clock on bus 50 to the decode unit 20 to activate the self-clock 40 and the decoding of the instruction in the next clock cycle. The feedback clock pulse on bus 50 is generated by register file 21 to "wake up" the previous pipeline stage, decoding unit 20, which in turn will generate a feedback clock pulse on bus 33 to wake up bus-interface unit 23 for instruction fetching.

To further improve the performance of the processor 12, another multiplex register, in addition to those shown in FIG. 7 for the queue buffer 220 can be used. In such an embodiment, if a stall condition lasts for only one clock cycle, then the "full" signal 112A is not asserted at all to the previous pipeline stage. The queue buffer in that embodiment can absorb an extra data event.

Figure 9:
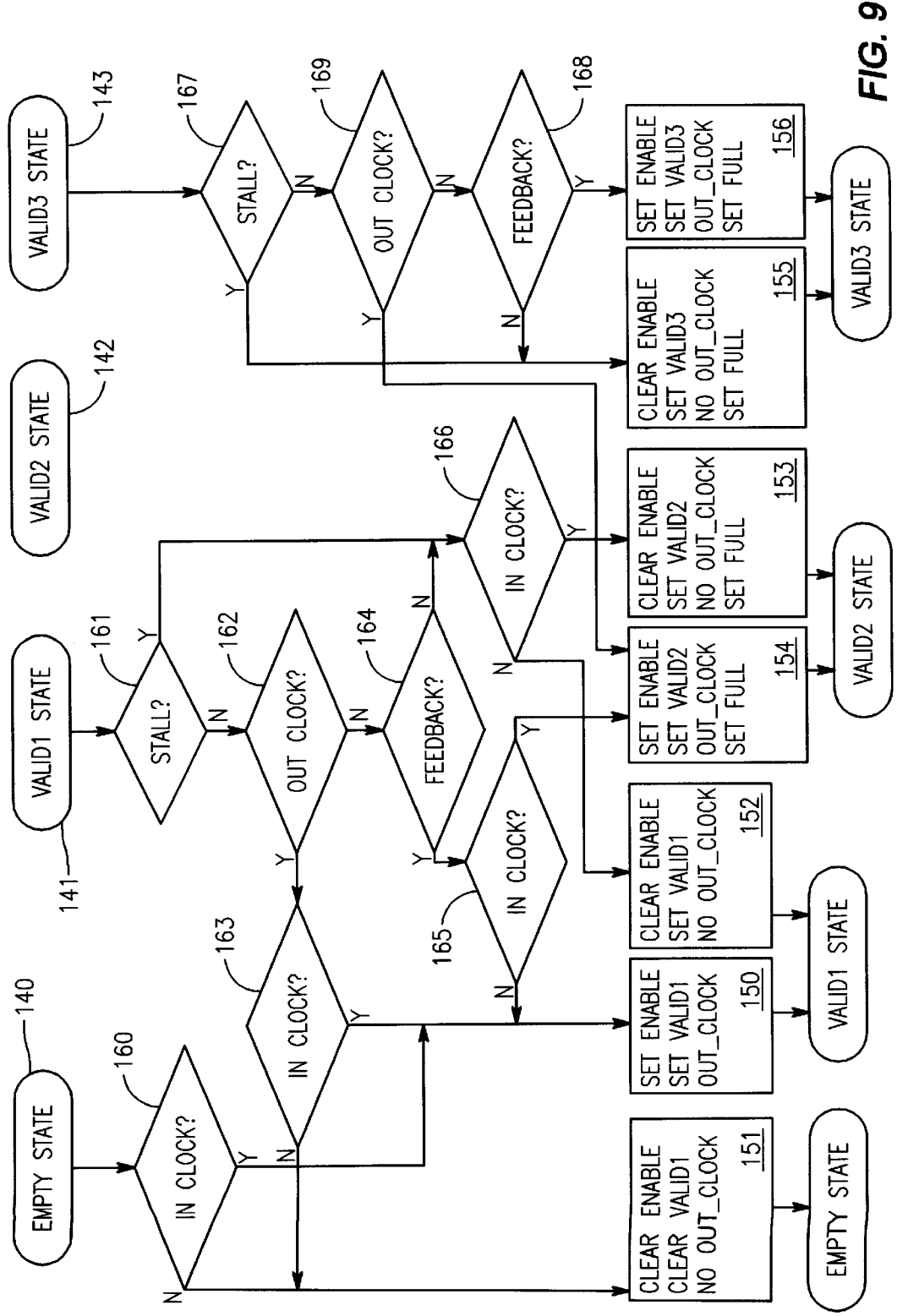
FIG. 9 is flow diagram of the control block of FIG. 7 for enabling the self-clock and setting the valid bits of the queue buffers.

Turning now to FIG. 9, the flow diagram of the control block 101 of FIG. 7 is shown. The number of step blocks 150–156 is increased compared to FIG. 6, because Out clocks can be disabled during a stall cycle. The empty state is similar to that of FIG. 6. In Valid1 state 141, if the stall is asserted in decision block 161, then In clock 110A of decision block 166 causes the current pipeline stage to remain in Valid1 state (block 152) or move to Valid2 state (block 153). In either case, the enable signal 60 (FIG. 7) for self-clock 102 is deactivated. The Valid2 state has valid data in both multiplex registers 106 and 104 along with their valid data signal 115 bits set. If the stall signal 114 is not asserted (block 161), and Out clock 110B is asserted (block 162), then In clock 110A of decision block 163 causes the current pipeline stage to return to empty state (block 151) or remain in the Valid1 state (block 150). If the stall signal 114 (block 161) and Out clock 110B (block 162) are not asserted, then a pulse from feedback clock 110C of decision block 164 enables the self-clock 102. If In clock 110A is asserted in decision block 165, then the current pipeline stage moves to Valid2 state (step block 154) or remains in Valid1 state (step block 150). The self-clock 102 is enabled in either case. If the stall signal 114 (block 161), Out clock 110B (block 162), and feedback clock 110C (block 164) are not asserted, then go to step 166. The In clock 110A of decision block 166 causes the current pipeline stage to remain in Valid1 state (block 152) or move to Valid2 state (block 153).

Valid2 state 142 is similar to the Valid1 state 141. The step blocks for Valid2 state would be Valid1, Valid2, and Valid3 states instead of Empty, Valid1, and Valid2 states, respectively. In Valid3 state 143, the assertion of feedback clock 110C (block 168) is necessary to activate the execute block 107 and self-clock 102 (block 156). If the stall signal in decision block 167 remains asserted, then the current pipeline stage remains in Valid3 state without any activity. If the stall signal (block 167) is not active and the Out clock 110B pulse (block 169) is active, then the current pipeline stage returns to Valid2 state, as in step block 154. Without stall signal (block 167) nor Out clock 110B pulse (block 169), the feedback clock of decision block 168 is needed to wake up the current pipeline stage, as in step block 156. The Valid3 state remains inactive (block 155) if the feedback clock is not asserted.

Figure 10:
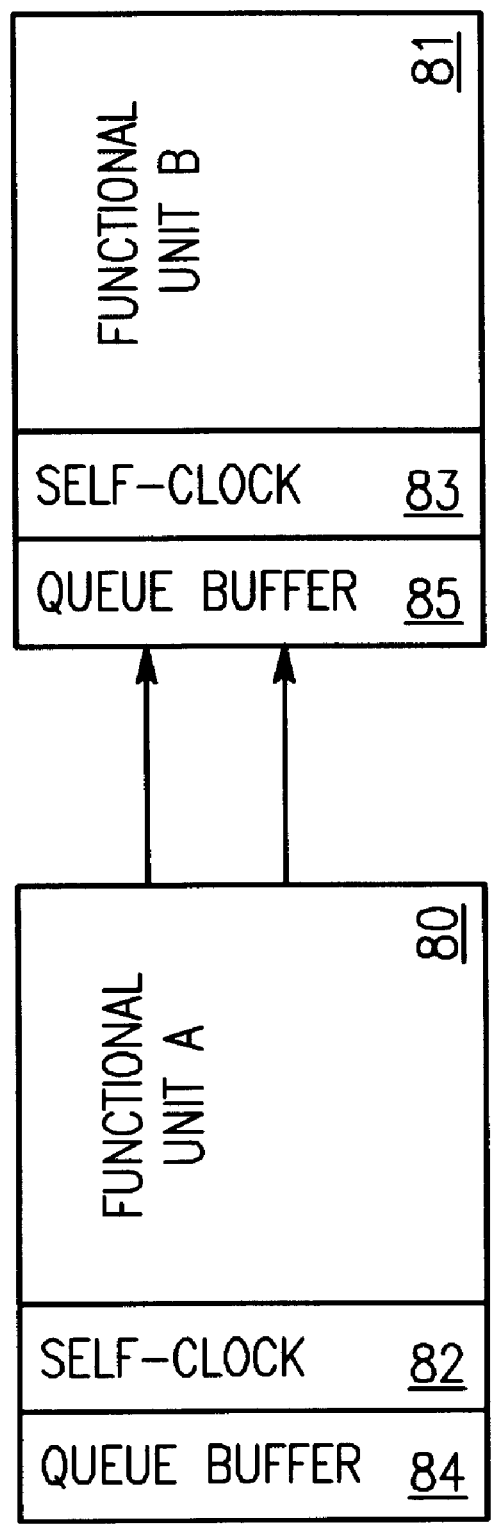
FIG. 10 is block diagram of an embodiment of two functional units having different clock periods for the self-clocks.

Turning now to FIG. 10, the block diagram shows an embodiment of two functional blocks, each having a different length Out clock. The Out clock for self-clock 83 has a period of one time unit, while the Out clock for self-clock 82 pipeline has a period of two time units. The functional unit B 81 needs one time unit delay for processing data, while functional unit A 80 needs two-time units delay for processing data. To meet the bandwidth requirement of the functional unit B 81 and to maintain the efficiency of pipelining, functional unit A 80 must supply two operations per Out clock for self-clock 82. The queue buffer 85 can accept two operations at a time. The queue buffer 85 can schedule the operations to be executed by functional unit 81, one at a time, by the order of the operations. When the pipeline is stalled, the number of entries in the queue buffer 85 must increase by a multiple of two for latching incoming operations. An example of this pipeline is an instruction cache and decode unit (not shown) of a processor. The instruction cache can fetch two instructions per clock cycle and uses a slower Out clock for fetching instructions from the instruction cache to send to the decode unit.

The microprocessor 12 of FIG. 1 may employ any suitable system bus protocol in communication to main memory, peripheral devices, and I/O devices. In one embodiment, the input/output bus is an Enhanced Industry Standard Architecture (EISA) bus. In another embodiment, the input/output bus is a Peripheral Component Interconnect (PCI) bus. It is noted that many variations of system bus protocols exist. In one embodiment, the main memory includes at least one Dynamic Random Access Memory (DRAM) and a DRAM memory controller. In another embodiment, the main memory includes at least one Read Only Memory (ROM) and a ROM memory controller. In a further embodiment, the main memory may include a cache memory with "lookaside" configuration and cache memory controller. It is noted that many variations of memory exist.

In accordance with the above disclosure, a simple pipeline microprocessor and pipeline stages have been shown which include a self-timed and self-enabled clock for single or multiple time-units. The self-timed clock design includes the capability to adjust and synchronize to an external clock, which provides the deterministic output for verification and testing. The pipeline stages includes queue buffers for latching incoming data in case of a stall, thus reducing the routing delay of the critical stall signal and avoiding refetching data. The invention contemplates a use with any processing unit having a synchronous clock or an asynchronous clock. It provides a method to distribute the self-enabled and self-timed clock to individual functional units in a pipeline processing unit.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A self-timed and self-enabled clock circuit for synchronizing operation of a digital circuit, comprising:
   a control circuit that detects input clock pulses and that provides an enable signal while the input clock pulses are provided; and
   a clock delay device, coupled to the control circuit, that has a plurality of inputs and an output that provides an output clock pulse when the clock delay device is enabled, the inputs including:
      a feedback clock input that is coupled to the output of the clock delay device;
      a clock input for receiving the input clock pulses; and
      an enable input that receives the enable signal to enable the clock delay device;
   wherein the clock delay device, when enabled by the enable signal, provides output clock pulses that are synchronized with the input clock pulses.

2. The clock circuit of claim 1 wherein the clock delay device comprises a plurality of delay blocks sequentially coupled together.

3. The clock circuit of claim 2 wherein the output of the clock delay device is coupled to each of the plurality of delay blocks such that each output clock pulse resets each of the plurality of delay blocks.

4. The clock circuit of claim 2 wherein at least one of the plurality of delay blocks provides an intermediate clock edge.

5. The clock circuit of claim 4 wherein the intermediate clock edge is used to control an associated functional block.

6. The clock circuit of claim 2 wherein each of the delay blocks comprises coupled logic gates.

7. The clock circuit of claim 2 wherein one of the plurality of delay blocks comprises programmable delay logic.

8. The clock circuit of claim 7 wherein the programmable delay logic comprises:
   a plurality of delay devices; and
   selection logic coupled to select any one of the plurality of delay devices.

9. The clock circuit of claim 8 further comprising:
   each of the plurality of delay devices receiving an external clock signal and providing a corresponding clock edge; and
   the selection logic selecting a delay device providing a clock edge that most closely corresponds with the external clock signal.

10. The clock circuit of claim 9 wherein the selection logic selects a delay device having a clock edge that occurs closest to a controlling edge of the external clock signal.

11. The clock circuit of claim 1 wherein the input clock pulses are provided from an output of another self-timed and self-enabled clock circuit.

12. The clock circuit of claim 1 further comprising:

the clock delay device including a second clock input; and wherein the clock delay device, when enabled by the enable signal, provides output clock pulses that are synchronized with the input clock pulses and clock signals provided to the second clock input.

13. The clock circuit of claim 12 further comprising:

the input clock pulses being provided from an output of a previous self-timed and self-enabled clock circuit; and the second clock input receiving clock pulses provided from a subsequent self-timed and self-enabled clock circuit.

14. The clock circuit of claim 1 further comprising:

a pulse shaper circuit, coupled to the clock delay device, that provides the output clock pulses.

15. The clock circuit of claim 1 further comprising:

the control circuit further including a stall input, the control circuit disabling the clock delay device if a stall signal is received at the stall input.

16. A distributed clock system for a digital circuit, comprising:

a first self clock that provides first output clock pulses when enabled, the first self clock comprising:
an output, a first input coupled to the output and a second input;
wherein the first self clock is enabled by each clock pulse received at the second input and synchronizes the first output clock pulses with respective clock signals received at the second input; and a second self clock that provides second output clock pulses when enabled, the second self clock comprising:
an output, a first input coupled to the output of the second self clock, and a second input coupled to the output of the first self clock;
wherein the second self clock is enabled by each clock pulse received at the second input and synchronizes the second output clock pulse with respective clock signals received at the second input of the second self clock.

17. The distributed clock system of claim 16 wherein the second input of the first self clock receives output clock pulses from a third self clock.

18. The distributed clock system of claim 16 wherein the second input of the first self clock receives an external clock signal.

19. The distributed clock system of claim 16 further comprising:

the second clock having a third input that receives an external clock signal; and wherein the second self clock synchronizes the second output clock pulses with respective clock signals received at its second and third inputs.

20. The distributed clock system of claim 16 further comprising:

the second self clock having a third input that receives output clock pulses from a third self clock; and wherein the second self clock synchronizes the second output clock pulses with respective clock signals received at its second and third inputs.

21. The distributed clock system of claim 16 wherein the first and second self clocks operate at approximately the same frequency.

22. The distributed clock system of claim 16 wherein at least one of the first and second self clocks operates at a frequency that is a multiple of other of the first and second self clocks.

23. The distributed clock system of claim 16 wherein the first and second self clocks operate asynchronously relative to each other.

24. The distributed clock system of claim 16 further comprising:

a first functional block receiving the first output pulses from the first self clock; and a second functional block receiving the second output pulses from the second self clock.

25. The distributed clock system of claim 24 wherein the first and second functional blocks operate at approximately the same frequency.

26. The distributed clock system of claim 24 wherein the first and second functional blocks operate asynchronously with respect to each other.

27. The distributed clock system of claim 24 further comprising:

a first queue buffer, coupled to the first functional block and receiving the first clock pulses, that receives data for the first functional block; and a second queue buffer, coupled to the second functional block and receiving the second clock pulses, that receives data from the first functional block for the second functional block.

28. The distributed clock system of claim 16 further comprising:

a functional block receiving the second output pulses from the second self clock; and a queue buffer, coupled to the functional block and receiving the second clock pulses, that receives data for the functional block.

29. The distributed clock system of claim 28 further comprising:

the second self clock having an enable input and providing the second output pulses if an enable signal is provided to the enable input; and a control block, coupled to the functional block, the queue buffer and the output of the first self clock, that provides the enable signal while receiving clock pulses from the first self clock.

30. The distributed clock system of claim 29 further comprising:

the functional block detecting a stall condition and asserting a stall signal; and the control block receiving the stall signal and providing the enable signal only while the stall signal is not asserted.

31. The distributed clock system of claim 30 further comprising:

a second functional block that detects a full condition and that asserts a full signal; and the control block receiving the full signal and providing the enable signal only while the full signal is not asserted.

32. The distributed clock system of claim 29 further comprising:

the control block detecting a full condition of the queue buffer and asserting a full signal to a previous functional block.

33. A processor, comprising:
a plurality of functional blocks, each comprising:
a queue buffer having a data input and a data output, the data input being the data input of the respective functional block;
an execution unit that has an input coupled to the data output of the queue buffer and an execution data output, the execution output being the data output of the respective functional block;
a self clock that has an output, a first clock input, a feedback input coupled to the output of the self clock, and an enable input;
the self clock, when enabled, providing output clock pulses that are synchronized with clock pulses received at the first clock input; and
a control block, coupled to the queue buffer, the execution unit and self clock, that has an enable output coupled to the enable input of the self clock;
the control block enabling the self clock while the execution unit is processing data and while clock pulses are received at the first clock input of the self clock; and
the plurality of functional blocks including a first and second functional blocks coupled together;
wherein a first clock input of the second functional block is coupled to a clock output of the first functional block, and wherein the data output of the first functional block is coupled to the data input of the second functional block.

34. The processor of claim 33 wherein the processor comprises a pipeline processor, and wherein each of the plurality of functional blocks is associated with a stage of the pipeline processor.

35. The processor of claim 33 wherein at least one functional block further comprises:
a second queue buffer coupled to the execution unit; and
a second self clock coupled to the control block and to the second queue buffer.

36. The processor of claim 33 wherein the queue buffer comprises a plurality of storage devices.

37. The processor of claim 36 wherein the plurality of storage devices comprise registers.

38. The processor of claim 33 further comprising:
the first functional block having a self clock with a second clock input; and
wherein a clock output of the second functional block is coupled to the second clock input of the first functional block.

39. The processor of claim 33 wherein at least one of the plurality of functional blocks receives an external clock signal.

40. The processor of claim 33 further comprising:
the execution unit detecting a stall condition and asserting a stall signal; and
the control block receiving the stall signal and disabling the self clock from providing clock pulses while the stall signal is provided.

41. The processor of claim 33 wherein the control unit includes a full input and disables the self clock from providing clock pulses while a full signal is received at the full input.

42. The processor of claim 41, the control unit including a full output, wherein the control unit detects a full condition of the queue buffer and asserts a full signal indicative thereof via the full output.

43. The processor of claim 42 further comprising:
a full output of the second functional block coupled to a full input of the first functional block.

44. The processor of claim 33 further comprising:
the queue buffer including a first storage device coupled to a second storage device and to the execution unit;
the second storage device storing new data from a previous functional block during a stall condition; and
the first storage device storing current data during the stall condition.

45. The processor of claim 33 further comprising:
the queue buffer including a first storage device coupled to a second storage device and to the execution unit;
the control block enabling the self clock to provide clock pulses only if valid data is stored in both the first and second storage devices.

46. A method of operating each of a plurality of coupled functional blocks of a digital system, comprising:
receiving input data and corresponding first input clock pulses;
activating a self clock to provide an output clock pulse for each first input clock pulse;
processing the input data and generating output data;
generating, by the self clock, an output clock pulse to correspond with each output data; and
deactivating the self clock while first input clock pulses are not received or during a stall condition.

47. The method of claim 46 further comprising:
receiving, from a subsequent functional block, second input clock pulses; and
synchronizing, by the self clock while enabled, output clock pulses with the first and second input clock pulses.

48. The method of claim 46, the first input clock pulses being provided from a previous functional block, further comprising:
receiving, from a subsequent functional block, second input clock pulses; and
operating the previous, a current and the subsequent functional blocks asynchronously with respect to each other.

49. The method of claim 46, the first input clock pulses being provided from a previous functional block, further comprising:
receiving, from a subsequent functional block, second input clock pulses; and
operating at least one of the previous, a current and the subsequent functional blocks at a frequency that is a multiple of at least one other of the previous, current and subsequent functional blocks.

50. The method of claim 46 further comprising:
the receiving first input clock pulses comprising receiving an external clock signal.

51. The method of claim 46 further comprising
generating, by the self clock, an intermediate clock edge between each of the first input clock pulses and the corresponding output clock pulses.

52. The method of claim 46 further comprising:

determining a stall condition; and disabling the self clock from providing output clock pulses during the stall condition.

53. The method of claim 52 further comprising:

refreshing current data in a current functional block during the stall condition.

54. The method of claim 46 further comprising:

receiving a full signal from a subsequent functional block; and disabling the self clock while the full signal is asserted.

55. The method of claim 54 further comprising:

refreshing current data in a current functional block while the full signal is asserted.

56. The method of claim 52 further comprising:

queuing the input data in a queue buffer;

detecting a full condition of the queue buffer; and disabling the self clock during the full condition.

57. The method of claim 56 further comprising:

refreshing current data in a current functional block during the full condition.

58. The method of claim 56, further comprising:

generating a full signal indicative of the full condition; and providing the full signal to a previous functional block.

* * * * *